US009088312B2

(12) United States Patent
Rahman et al.

(10) Patent No.: US 9,088,312 B2
(45) Date of Patent: Jul. 21, 2015

(54) METHODS FOR LINEAR RF BEAM SEARCH IN MILLIMETER WAVE COMMUNICATION SYSTEM WITH HYBRID BEAM-FORMING

(71) Applicant: Samsung Electronics Co., Ltd., Suwon-si, Gyeonggi-do (KR)

(72) Inventors: Md. Saifur Rahman, Richardson, TX (US); Kaushik Morapakkam Josiam, Fort Worth, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/281,519

(22) Filed: May 19, 2014

(65) Prior Publication Data

US 2014/0341310 A1 Nov. 20, 2014

Related U.S. Application Data

(60) Provisional application No. 61/824,862, filed on May 17, 2013, provisional application No. 61/861,300, filed on Aug. 1, 2013.

(51) Int. Cl.
*H04K 1/10* (2006.01)
*H04L 27/28* (2006.01)
(Continued)

(52) U.S. Cl.
CPC .......... *H04B 7/0408* (2013.01); *H04L 27/2601* (2013.01)

(58) Field of Classification Search
CPC ...... H04B 7/0408; H04B 7/04; H04B 7/0404; H04B 7/0413; H04B 7/0417; H04B 7/0669; H04L 27/2601; H04L 27/2647; H04L 1/0618

USPC ......... 375/260, 284, 285, 346, 267, 299, 347, 375/296; 455/509, 500, 501, 101; 370/329, 370/252; 342/372, 373
See application file for complete search history.

(56) References Cited

U.S. PATENT DOCUMENTS

2010/0103045 A1* 4/2010 Liu et al. ........................ 342/372
2012/0230380 A1* 9/2012 Keusgen et al. ............... 375/227
(Continued)

FOREIGN PATENT DOCUMENTS

WO WO 2007/114804 A1 10/2007

OTHER PUBLICATIONS

International Search Report dated Sep. 2, 2014 in connection with International Patent Application No. PCT/KR2014/004472, 3 pages.
(Continued)

*Primary Examiner* — Phuong Phu

(57) ABSTRACT

Embodiments provide a system, an apparatus, or a method for communicating in a wireless network with a plurality of transmitter radio frequency (RF) chains and a plurality of receiver RF chains. The method includes identifying a set of measurements of a channel for a plurality of transmit and receive beams from the plurality of transmitter and receiver RF chains. The method also includes separating the plurality of transmitter and receiver RF chains into a first subset and a second subset. The method also includes initializing at least one beam to all transmitter RF chains and at least one beam to all receiver RF chains in the first subset. The method also includes identifying at least one selected beam of the plurality of transmit beams to all transmitter RF chains and at least one beam of the plurality of receive beams to all receiver RF chains in the second subset.

22 Claims, 22 Drawing Sheets

(51) Int. Cl.
*H04B 7/04* (2006.01)
*H04L 27/26* (2006.01)

(56) References Cited

U.S. PATENT DOCUMENTS

| | | | |
|---|---|---|---|
| 2013/0028341 A1 | 1/2013 | Ayach et al. | |
| 2013/0039445 A1 | 2/2013 | Hwang | |
| 2013/0072124 A1 | 3/2013 | Nsenga | |
| 2013/0072244 A1* | 3/2013 | Jeong et al. | 455/509 |
| 2013/0088383 A1 | 4/2013 | Forstner et al. | |
| 2013/0286960 A1* | 10/2013 | Li et al. | 370/329 |
| 2013/0301454 A1* | 11/2013 | Seol et al. | 370/252 |
| 2013/0329820 A1* | 12/2013 | Harel et al. | 375/267 |
| 2014/0050280 A1* | 2/2014 | Stirling-Gallacher et al. | 375/296 |
| 2014/0126620 A1* | 5/2014 | Maltsev et al. | 375/227 |

OTHER PUBLICATIONS

Written Opinion of International Searching Authority dated Sep. 2, 2014 in connection with International Patent Application No. PCT/KR2014/004472, 5 pages.

* cited by examiner

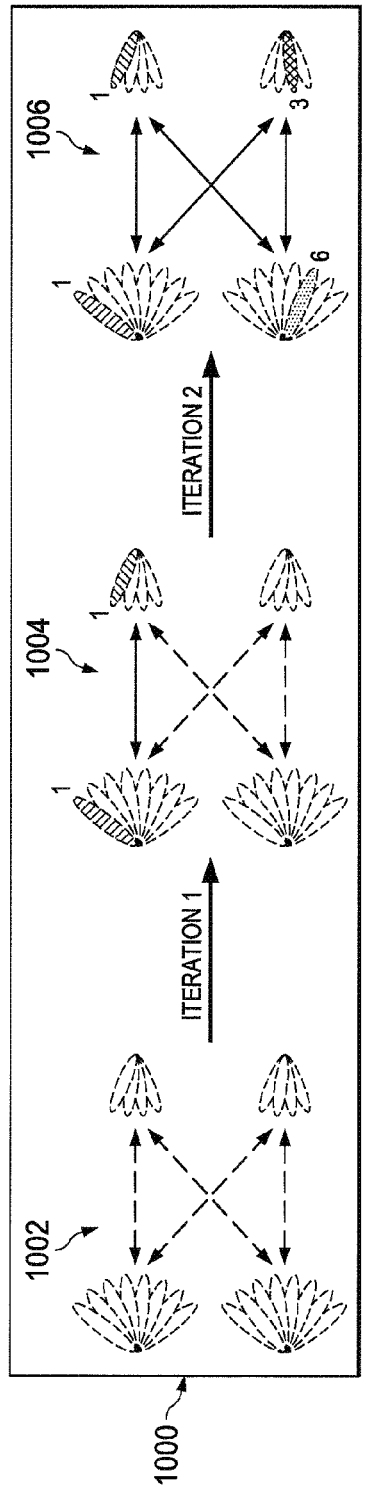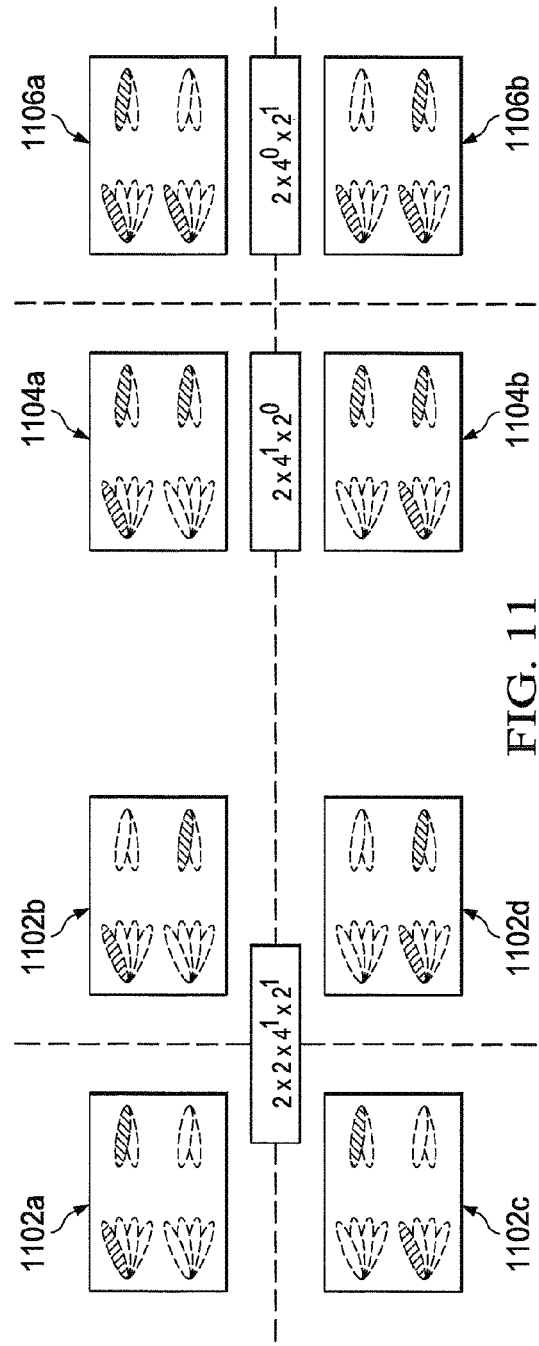
FIG. 10
FIG. 11

METHODS FOR LINEAR RF BEAM SEARCH IN MILLIMETER WAVE COMMUNICATION SYSTEM WITH HYBRID BEAM-FORMING

CROSS-REFERENCE TO RELATED APPLICATION(S) AND CLAIM OF PRIORITY

The present application is related to U.S. Provisional Patent Application No. 61/824,862, filed May 17, 2013, entitled "METHODS FOR LINEAR RF BEAM SEARCH IN MILLIMETER WAVE COMMUNICATION SYSTEM WITH HYBRID BEAM-FORMING" and U.S. Provisional Patent Application No. 61/861,300, filed Aug. 1, 2013, entitled "METHODS FOR LINEAR RF BEAM SEARCH IN MILLIMETER WAVE COMMUNICATION SYSTEM WITH HYBRID BEAM-FORMING." Provisional Patent Applications No. 61/824,862 and 61/861,300 are assigned to the assignee of the present application and are hereby incorporated by reference into the present application as if fully set forth herein. The present application hereby claims priority under 35 U.S.C. §119(e) to U.S. Provisional Patent Applications No. 61/824,862 and 61/861,300.

TECHNICAL FIELD

The present application relates generally to wireless communications and, more specifically, to a system for selecting radio frequency beams for radio frequency chains.

BACKGROUND

Beamforming is a signal processing technique used in sensor arrays for directional signal transmission or reception. This is achieved by combining elements in a phased array in such a way that signals at particular angles experience constructive interference while others experience destructive interference. Beamforming can be used at both the transmitting and receiving ends in order to achieve spatial selectivity. The improvement compared with omnidirectional reception/transmission is known as the receive/transmit gain (or loss).

Large bandwidths available at millimeter wave frequencies for communication systems can be used to combat the exponential rise in the demand for data traffic. At millimeter wave frequencies, massive antenna arrays can be used to beamform the signal in a particular direction in order to mitigate the effects of increased path loss. Beamforming can be applied either in the digital domain or analog radio frequency (RF) domain. Digital beamforming at millimeter wave frequencies is impractical due to costly and power consuming hardware requirements, and RF beamforming alone does not capture the channel's dominant Eigen mode. Therefore, a hybrid beamforming structure is proposed for OFDM based millimeter wave systems by combining both digital and RF beamforming, where digital beamforming is applied per subcarrier before the IFFT processing at the transmitter and RF beamforming is applied per OFDM symbol in the analog domain. Similar hybrid beamforming can be applied at the receiver.

The hybrid beamforming transmission strategy involves determining a combination of digital precoder to be used at the transmitter and RF beams at each of the RF chains at both transmitter and receiver that together extract the maximum instantaneous channel capacity. The optimal codebook-based RF beam search at all transmitter and receiver RF chains has an exponential complexity in both the number of RF chains at the transmitter and that at the receiver, which is infeasible in practice.

SUMMARY

One or more embodiments provide a method for communicating in a wireless network with a plurality of transmitter radio frequency (RF) chains and a plurality of receiver RF chains. The method includes identifying a set of measurements of a channel for a plurality of transmit and receive beams from the plurality of transmitter and receiver RF chains. The method also includes separating the plurality of transmitter and receiver RF chains into a first subset and a second subset. The method also includes initializing at least one beam of the plurality of transmit beams to all transmitter RF chains and at least one beam of the plurality of receive beams to all receiver RF chains in the first subset. The method also includes identifying at least one selected beam of the plurality of transmit beams to all transmitter RF chains and at least one beam of the plurality of receive beams to all receiver RF chains in the second subset. The method also includes the maximum size of the second subset. The method also includes an inner iteration to update selected beams from a plurality of transmit and receive beams sequentially in subsets of the transmitter and receiver RF chains by keeping the beams to the rest of the transmitter and receiver RF chains unchanged until all transmitter and receiver RF chains are updated with a selected beam from a plurality of transmit and receive beams. The size of the subset in each of the inner iteration is at most equal to the size of the second subset that is considered in the method. The method also includes an outer iteration to update beams of the plurality of transmit and receive beams to all transmitter and receiver RF chains based on the inner iteration. The method also includes at least one metric for the inner and outer iterations.

One or more embodiments provide an apparatus. The apparatus includes a controller. The controller is configured to identify a set of measurements of a channel for a plurality of transmit and receive beams from the plurality of transmitter and receiver RF chains. The controller is also configured to separate the plurality of transmitter and receiver RF chains into a first subset and a second subset. The controller is configured to initialize at least one beam of the plurality of transmit beams to all transmitter RF chains and at least one beam of the plurality of receive beams to all receiver RF chains in the first subset. The controller is configured to identify at least one selected beam of the plurality of transmit beams to all transmitter RF chains and at least one beam of the plurality of receive beams to all receiver RF chains in the second subset. The controller is configured with the maximum size of the second subset. The controller is configured to perform an inner iteration to update selected beams from a plurality of transmit and receive beams sequentially in subsets of the transmitter and receiver RF chains by keeping the beams to the rest of the transmitter and receiver RF chains unchanged until all transmitter and receiver RF chains are updated with a selected beam from a plurality of transmit and receive beams. The controller is configured to choose the size of the subset in each of the inner iteration to be at most equal to the size of the second subset that is configured. The controller is configured to perform an outer iteration to update beams of the plurality of transmit and receive beams to all transmitter and receiver RF chains based on the inner iteration. The controller is configured with at least one metric for the inner and outer iterations.

To address the above-discussed deficiencies of the prior art, it is a primary object to provide, for use in a wireless communication system, a system, apparatus, and method for identifying RF beams.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 illustrates an example iterative initialization process according to this disclosure;

FIG. 11 illustrates an example linear search process according to this disclosure;

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method.

Figure 1:
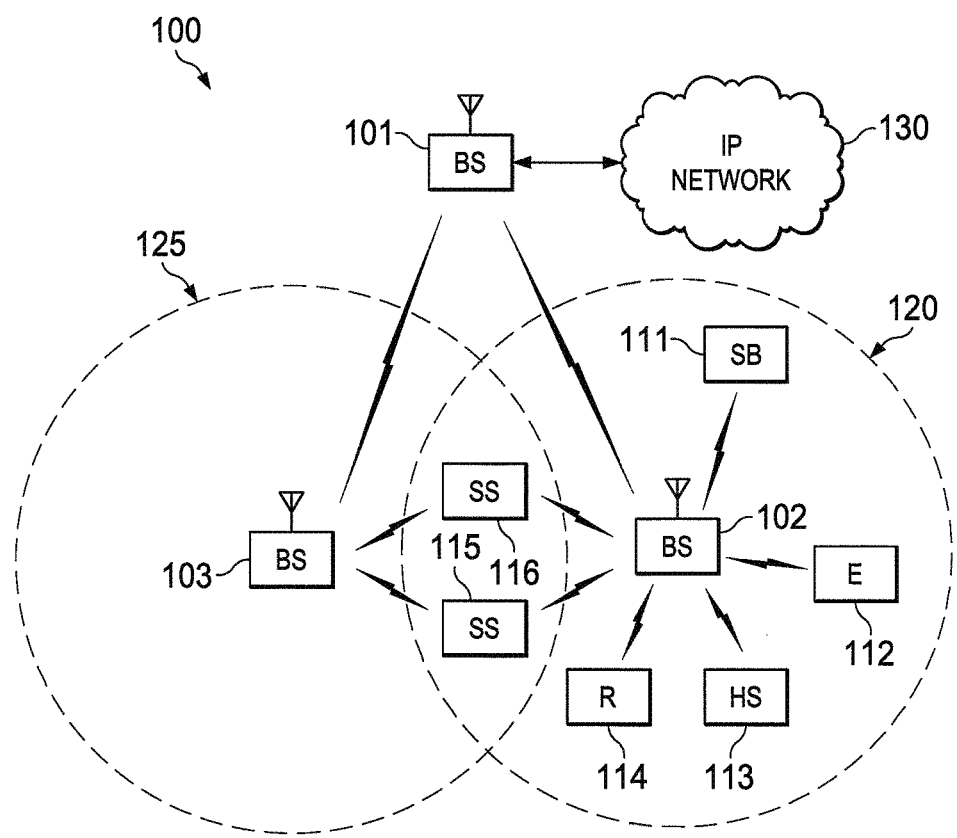
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipment (UE) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

As described below, the communication between the transmitter and the receiver in a wireless network, such as the one shown in FIG. 1, may be an orthogonal frequency division multiplexing (OFDM) based communication.

Figure 2A:
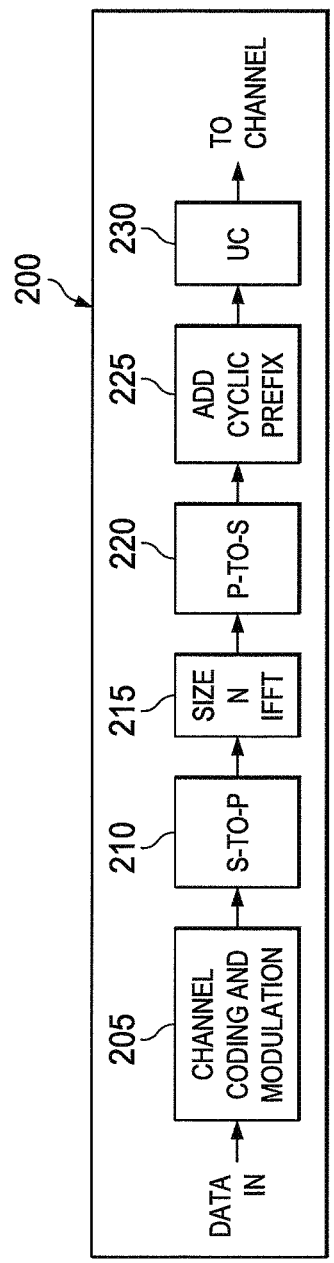
FIG. 2A is a high-level diagram of the orthogonal frequency division multiplexing (OFDM) transmit path in a transmitter according to one embodiment of the disclosure.
Figure 2B:
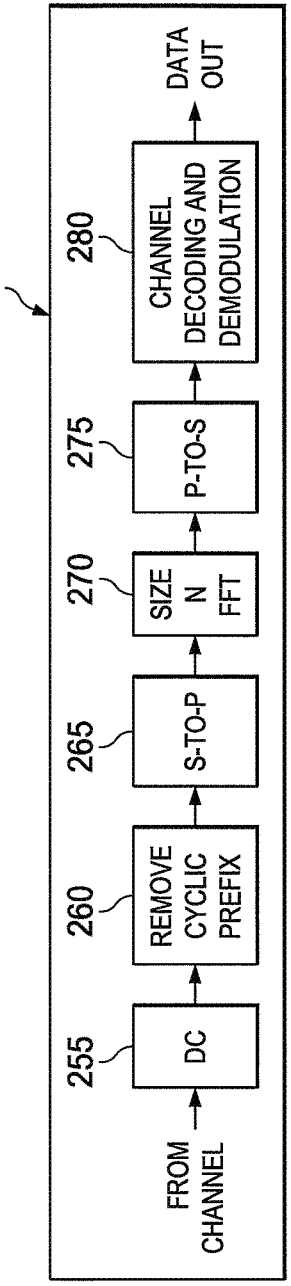
FIG. 2B is a high-level diagram of the orthogonal frequency division multiplexing (OFDM) receive path in a receiver according to one embodiment of the disclosure.

FIG. 2A is a high-level diagram of the transmit path in OFDM transmitter 200 according to an exemplary embodiment of the disclosure. FIG. 2B is a high-level diagram of the receive path in OFDM receiver 260 according to an exemplary embodiment of the disclosure. OFDM transmitter 200 comprises quadrature amplitude modulation (QAM) modulator 205, serial-to-parallel (S-to-P) block 210, Inverse Fast Fourier Transform (IFFT) block 215, parallel-to-serial (P-to-S) block 220, add cyclic prefix block 225, and up-conversion block 230. OFDM receiver 250 comprises down-conversion block 255, remove cyclic prefix block 260, serial-to-parallel (S-to-P) block 265, Fast Fourier Transform (FFT) block 270, parallel-to-serial (P-to-S) block 275, and quadrature amplitude modulation (QAM) demodulator 280.

At least some of the components in FIGS. 2A and 2B may be implemented in software while other components may be implemented by configurable hardware or a mixture of software and configurable hardware. In particular, it is noted that the FFT blocks and the IFFT blocks described in FIGS. 2A and 2B may be implemented as configurable software algorithms, where the values of FFT and IFFT sizes may be modified according to the implementation.

QAM modulator 205 receives a stream of input data and modulates the input bits (or symbols) to produce a sequence of frequency-domain modulation symbols. Serial-to-parallel block 210 converts (i.e., de-multiplexes) the serial QAM symbols to parallel data to produce M parallel symbol streams where M is the IFFT/FFT size used in OFDM transmitter 200 and OFDM receiver 250. IFFT block 215 then performs an IFFT operation on the M parallel symbol streams to produce time-domain output signals. Parallel-to-serial block 220 converts (i.e., multiplexes) the parallel time-domain output symbols from IFFT block 215 to produce a serial time-domain signal.

Add cyclic prefix block 225 then inserts a cyclic prefix to each OFDM symbol in the time-domain signal. As is well known, the cyclic prefix is generated by copying the last G samples of an N sample OFDM symbol and appending the copied G samples to the front of the OFDM symbol. Finally, the output samples of the cyclic prefix block are then sent to up-conversion conversion block 230 prior to being transmitted from multiples transmit antennas.

The transmitted RF signal arrives at OFDM receiver 250 after passing through the wireless channel and reverse operations to those in OFDM transmitter 200 are performed. The down-conversion block 255 down converts the received signal. Remove cyclic prefix block 260 removes the cyclic prefix to produce the serial time-domain baseband signal. Serial-to-parallel block 265 converts the time-domain baseband signal to parallel time domain signals. FFT block 270 then performs an FFT algorithm to produce M parallel frequency-domain signals. Parallel-to-serial block 275 converts the parallel frequency-domain signals to a sequence of QAM data symbols. QAM demodulator 280 then demodulates the QAM symbols to recover the original input data stream.

The exemplary transmit path of OFDM transmitter 200 may be representative of the transmit paths of any one of base stations 101-103 or any one of subscriber stations 111-116. Similarly, the exemplary receive path of OFDM receiver 250 may be representative of the transmit paths of any one of base stations 101-103 or any one of subscriber stations 111-116. However, since multiple antenna configurations are more common in base stations than in subscriber stations or other mobile devices, for the sake of simplicity and clarity, the descriptions that follow will be directed toward transactions between a base station (e.g., BS 102) that implements a transmit path similar to OFDM transmitter 200 and a subscriber station (e.g., SS 116) that implements a receive path similar to OFDM receiver 250. However, such an exemplary embodiment should not be construed to limit the scope of the present disclosure. It will be appreciated by those skilled in the art that in cases where multiple antennas are implemented in a subscriber station, the transmit path and the receiver path of both the base station and the subscriber station may be implemented as in shown in FIGS. 2A and 2B.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
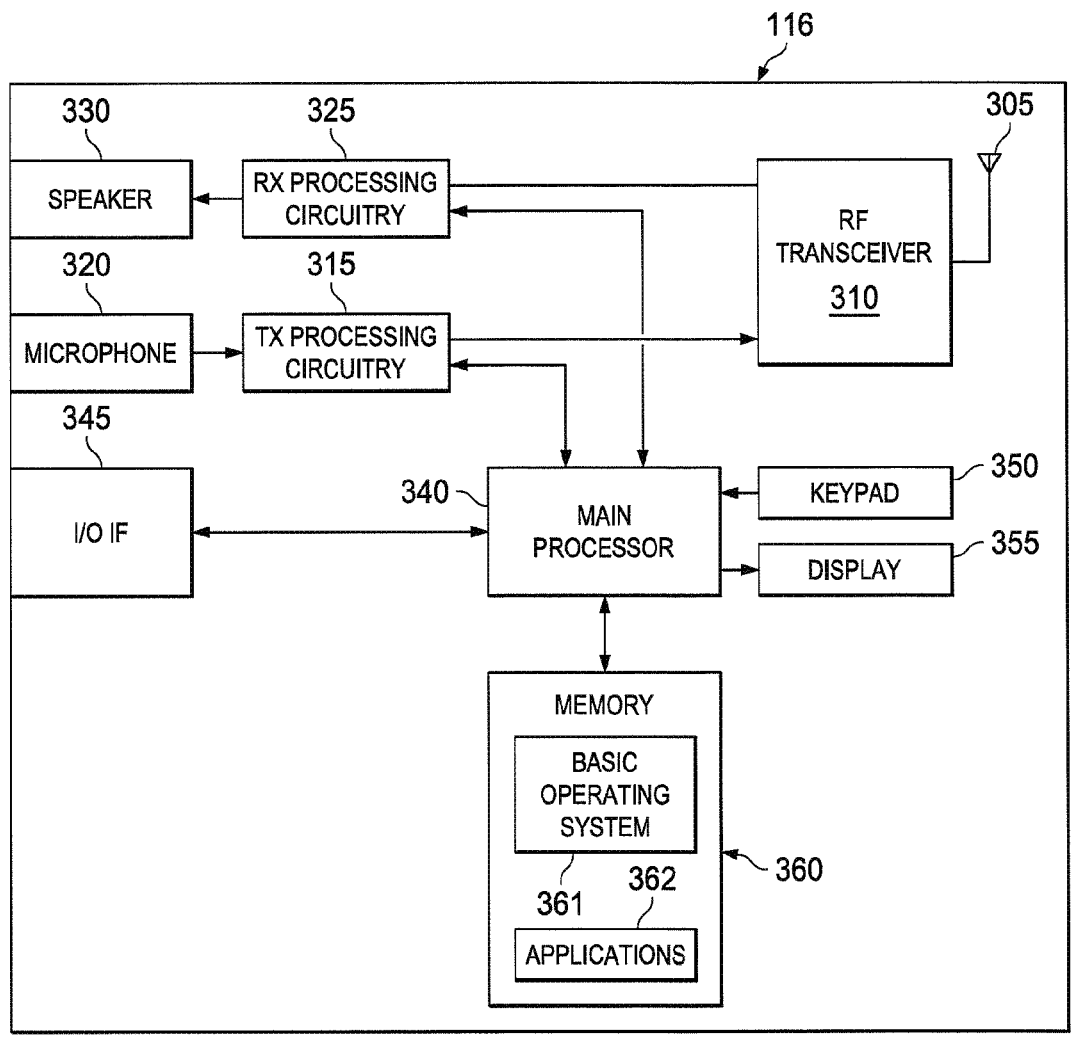
FIG. 3 illustrates an example UE according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

As described below, the communication between the transmitter and the receiver in a wireless network, such as the one shown in FIG. 1, may be an OFDM based millimeter wave communication in which the transmitter and the receiver operate at millimeter wave frequencies.

Using large bandwidths (up to 1 GHz) available at the millimeter wave frequencies for communication systems is one proposed solution to combat the exponential rise in the demand for data traffic. One or more embodiments of this disclosure recognize and take into account, a challenge associated with the millimeter wave frequencies, that is the large path loss associated with the larger carrier frequencies. At millimeter wave frequencies, the antenna shrinks in size and more antennae can be packed in a given array. The antenna array can be used to beam-form the signal in a particular direction. The power gain due to beamforming at both transmitter and receiver is being considered to mitigate the effects of increased path loss.

Communication systems like LTE-Advanced and IEEE 802.11ac that operate at microwave frequencies use beamforming in digital domain. The various embodiments of this disclosure recognize and take into account that digital beamforming for the millimeter wave communication system is impractical due to costly and power consuming hardware requirements. Therefore, beam-forming in the analog radio frequency (RF) domain is used. An example of a system using RF beamforming in millimeter wave is IEEE 802.11ad Wireless LAN technology operating at 60 GHz. However, for the millimeter wave cellular system, the use of only RF beam-forming restricts the resource allocation across users and fails to capture the Eigen modes of the channel. In an intermediate solution, a hybrid beam-forming structure (HBF) combines both RF and digital beam-forming: each RF chain is connected to an antenna array capable of RF beamforming and the input to each RF chain is from a digital precoder. An RF chain is a transceiver pathway containing the baseband and RF elements that includes the antenna array.

As described in more detail below, one or more embodiments focus on a RF beamforming portion of a millimeter wave communication system with a HBF structure and a codebook-based RF beam-forming and search for the optimal RF beam-formers from the codebook. This search, however, has an exponential complexity in both the number of RF chains at the transmitter (TX) and that at the receiver (RX). For example, with one RF chain at the TX and one RF chain at the RX, the complexity is linear in the number of beams at the TX and RX. However, if either TX or RX increases their RF chains to two, the complexity increases to square of the number of beams at either TX or RX. Linear increase in the number of RF chains results in exponential search complexity. Since this exponential increase is untenable in practice, one or more embodiments of this disclosure provide a class of RF beam search algorithms that vary in complexity from sub-exponential to linear. At least one or more embodiments of this disclosure focus on iterative RF beam search involving a subset of RF chains where the size of the subset can be altered to accommodate different complexities.

One embodiment provides a general algorithm with no restrictions on the metric. By keeping the metric very general the system is able to accommodate different scenarios like single user (SU) and multi-user (MU) MIMO.

One embodiment provides a general algorithm with rank adaptation where the rank adaptation is performed together with the inner iteration of the disclosed subset RF beam search algorithm.

One embodiment provides a general algorithm with rank adaptation where the rank adaptation is performed together with the outer iteration of the disclosed subset RF beam search algorithm.

In one or more embodiments of this invention, the rank adaptation uses the rank dependent digital pre-coder at the transmitter, which is either codebook based or non-codebook based.

Another embodiment provides reducing the general algorithm to two variants whose complexities scale linearly by forcing the subset of RF chains for the beam search to be one. The linear versions emerge because of a joint optimization of the TX-RX beam pair per TX-RX RF chain pair or a separate optimization of the TX and RX beams at every TX and RX RF chain.

Yet another embodiment provides the linear variants with different initializations and identify the combination of the algorithm and initialization that offer the best tradeoff between complexity and performance for both single stream (diversity only) and multiple stream (diversity and rank) capable systems.

The evaluation is empirically performed on a sounding channel platform in a cellular environment that simulates the transmission of a reference symbol on the different RF beams from the mobile station to the base station. Using the proposed algorithm, significant complexity reduction can be achieved with very little performance loss.

Herein, I and 0 may denote identity and zero matrices of appropriate dimensions. Vectors are column vectors unless otherwise specified. The size of a set A is denoted by |A|. The same notation |x| denotes the absolute value of a real number x. Herein, ||m|| (and ||M||) denote the norm of a vector m (and a matrix M). Also herein, det(M) for the determinant of the matrix M. The transpose and conjugate transpose of a vector or a matrix are denoted by the superscript T and H, respectively. Let B be a N×N block diagonal matrix whose diagonal blocks are vectors of dimensions M×1. For any subset $A \subseteq \{1, \ldots, N\}$, $b_A$ denotes |A| vectors, each of dimension M×1, and use the notation $B(A)=b_A$ to denote the operation in which the diagonal blocks of B with indices in A are assigned vectors from $b_A$ in respective order. For a set S, S(m) denotes the set of all subsets of S whose size are m, where S(0)=Ø, an empty set, and $S^m$ denotes the Cartesian power of S, where $S^0$=Ø.

As described in more detail below, one or more embodiments provide a method for communicating in a wireless network with a plurality of transmitter radio frequency (RF) chains and a plurality of receiver RF chains. The method includes identifying a set of measurements of a channel for a plurality of transmit and receive beams from the plurality of transmitter and receiver RF chains. The method also includes separating the plurality of transmitter and receiver RF chains into a first subset and a second subset. The method also includes initializing at least one beam of the plurality of transmit beams to all transmitter RF chains and at least one beam of the plurality of receive beams to all receiver RF chains in the first subset. The method also includes identifying at least one selected beam of the plurality of transmit beams to all transmitter RF chains and at least one beam of the plurality of receive beams to all receiver RF chains in the second subset. The method also includes the maximum size of the second subset. The method also includes an inner iteration to update selected beams from a plurality of transmit and receive beams sequentially in subsets of the transmitter and receiver RF chains by keeping the beams to the rest of the transmitter and receiver RF chains unchanged until all transmitter and receiver RF chains are updated with a selected beam from a plurality of transmit and receive beams. The size of the subset in each of the inner iteration is at most equal to the size of the second subset that is considered in the method. The method also includes an outer iteration to update beams of the plurality of transmit and receive beams to all transmitter and receiver RF chains based on the inner iteration. The method also includes at least one metric for the inner and outer iterations.

Figure 4:
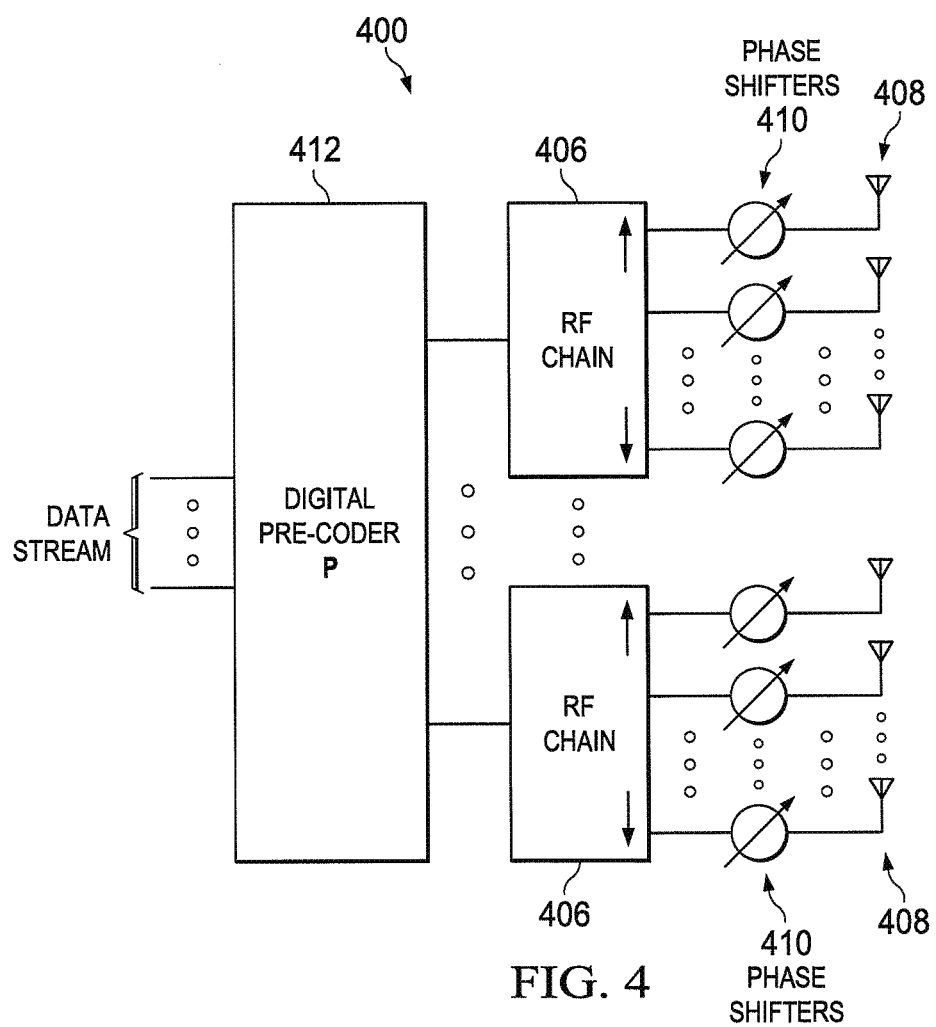
FIG. 4 illustrates an example hybrid beamforming structure at the transmitter according to this disclosure.

FIG. 4 illustrates an example millimeter wave communication system 400 with hybrid beamforming structure at the transmitter according to this disclosure. The embodiment of the system 400 illustrated in FIG. 4 is for illustration only. System 400 in FIG. 4 does not limit the scope of this disclosure to any particular implementation of a millimeter wave communication system. In an embodiment, the system 400 includes an RF chain 406, an antenna 408, a phase shifter 410, and a digital pre-coder 412.

In an embodiment, a millimeter wave communication system 400 is to support SU-MIMO. In this embodiment, HBF structure is at the TX. In other embodiments, the HBF structure may be a RX. There are $N_t$ RF chains 406. Each RF chain 406 consists of $N_t^{RF}$ antennae 408, where each antenna 408 is connected to one RF phase shifter 410. The phase values of the phase shifters 410 of the ith RF chain 406 form a $N_t^{RF} \times 1$ beam-forming vector $w_i$. All RF chains together form a $N_t \times N_t$ block diagonal beam-forming matrix W whose each diagonal block is a $N_t^{RF} \times 1$ beam-forming vector. Each RF chain receives an input from a $N_t \times N_s$ digital pre-coder matrix P, which maps $N_s$ data streams to $N_t$ RF chains.

A RX has a similar structure. There are $N_r$ RF chains, each of which consists of $N_r^{RF}$ antennae and each antenna has one RF phase shifter. The $N_r^{RF} \times 1$ beam-forming vector of the ith RF chain is $v_i$. The overall $N_r \times N_r$ block diagonal beam-forming matrix is given by V whose each diagonal block is a $N_r^{RF} \times 1$ beam-forming vector. The outputs of different RF chains are combined using a $N_r \times n_s$ digital combiner matrix U.

In an example embodiment, H is the $N_r N_r^{RF} \times N_t N_t^{RF}$ MIMO channel from the TX to the RX. The received signal at the RX is given by $y=U^H V^H H W P s + U^H V^H n$, where s is the $N_s \times 1$ vector of data streams, and n is the $N_r N_r^{RF} \times 1$ additive white complex Gaussian noise vector. There is a total power constraint on the transmitted data streams. Without loss of generality, the overall power of the transmitted data streams is normalized to one.

In an example embodiment, a hybrid beam-forming solution uses a joint optimization over all choices of RF and digital beam-formers (V, W, P, and U). The complexity of this joint optimization, however, is prohibitive in practice. An alternate separation-based suboptimal approach is to first find the optimal RF beam-formers (V and W), and then use them to obtain the digital beam-formers (P and U). This separation-based approach and focus is adopted on the RF beam-forming part. One or more embodiments find the optimal RF beam-formers assuming that they are chosen from a codebook both at the TX and at the RX.

In an example embodiment, $C_t$ and $C_r$ are the codebooks containing RF beam-forming vectors used at the TX and at the RX, respectively. The number of possible RF beam-forming solutions is $(|C_t|)^{N_t} \times (|C_r|)^{N_r}$. Therefore, to obtain the RF beam-forming solution from the codebook, the system performs an exponential search in the number of TX and RX RF chains. This search complexity could be very large even for reasonable values of $N_t$, $N_r$, $|C_t|$, and $|C_r|$. In order to reduce the search complexity, one or more embodiments of this disclosure provides a class of RF beam search algorithms with complexities varying from exponential to linear in the number of TX and RX RF chains.

Figure 5:
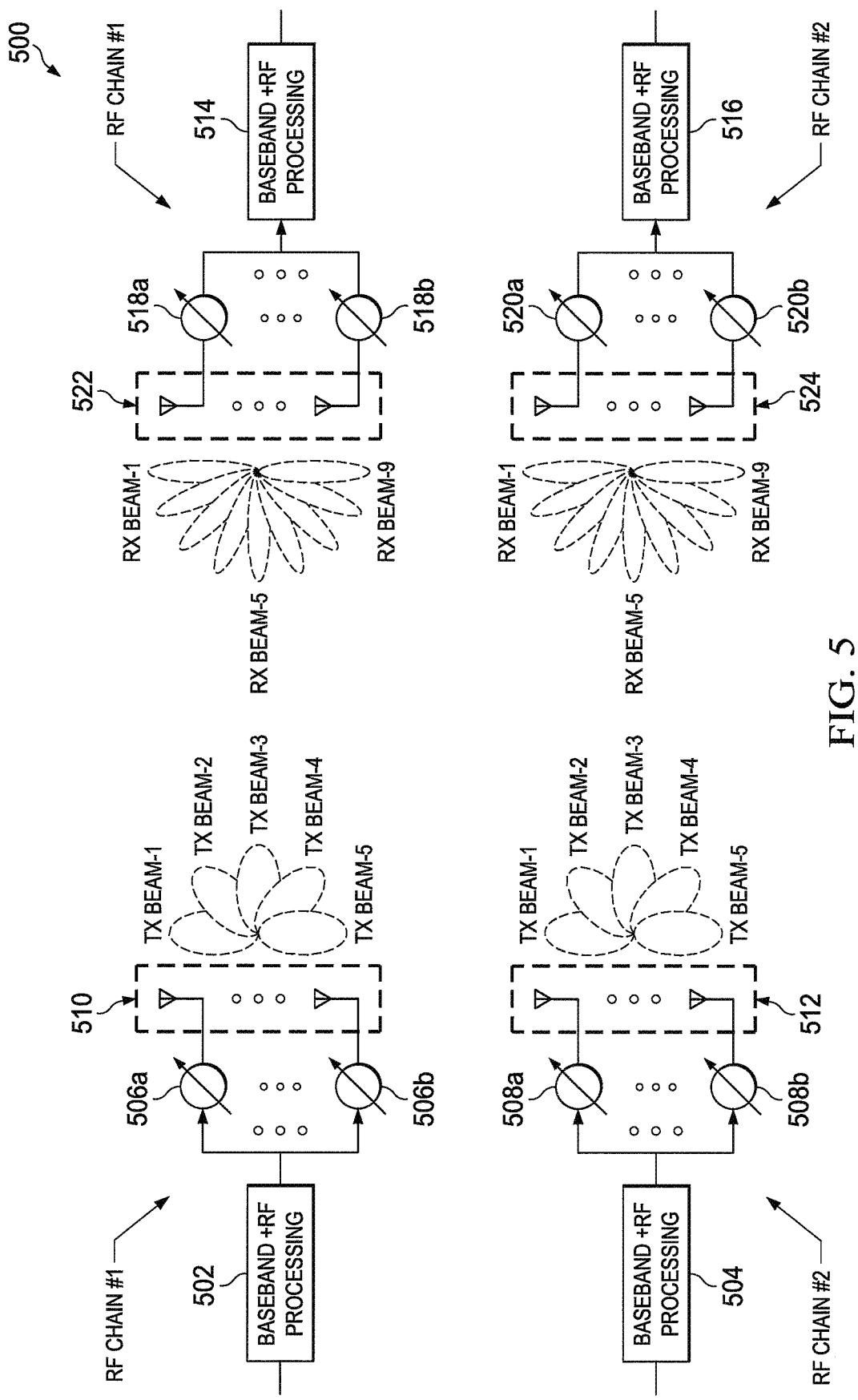
FIG. 5 illustrates an example RF beams at the transmitter and receiver RF chains according to this disclosure.

FIG. 5 illustrates an example millimeter wave communication system 500 with RF beams at the transmitter and receiver RF chains according to this disclosure. The embodiment of the system 500 illustrated in FIG. 5 is for illustration only. System 500 in FIG. 5 does not limit the scope of this disclosure to any particular implementation of a millimeter wave communication system. In an embodiment, the system 500 includes a TX RF chains 502-504, phase shifters 506a-b and 508a-b, antenna arrays 510-512, TX beams 1-5 for TX RF chain 502 and TX beams 1-5 for TX RF chain 504, RX RF chains 514-516, phase shifters 518a-b and 520a-b, antenna arrays 522-524, and RX beams for RX RF chain 514 and RX beams for RX RF chain 516.

Figure 6:
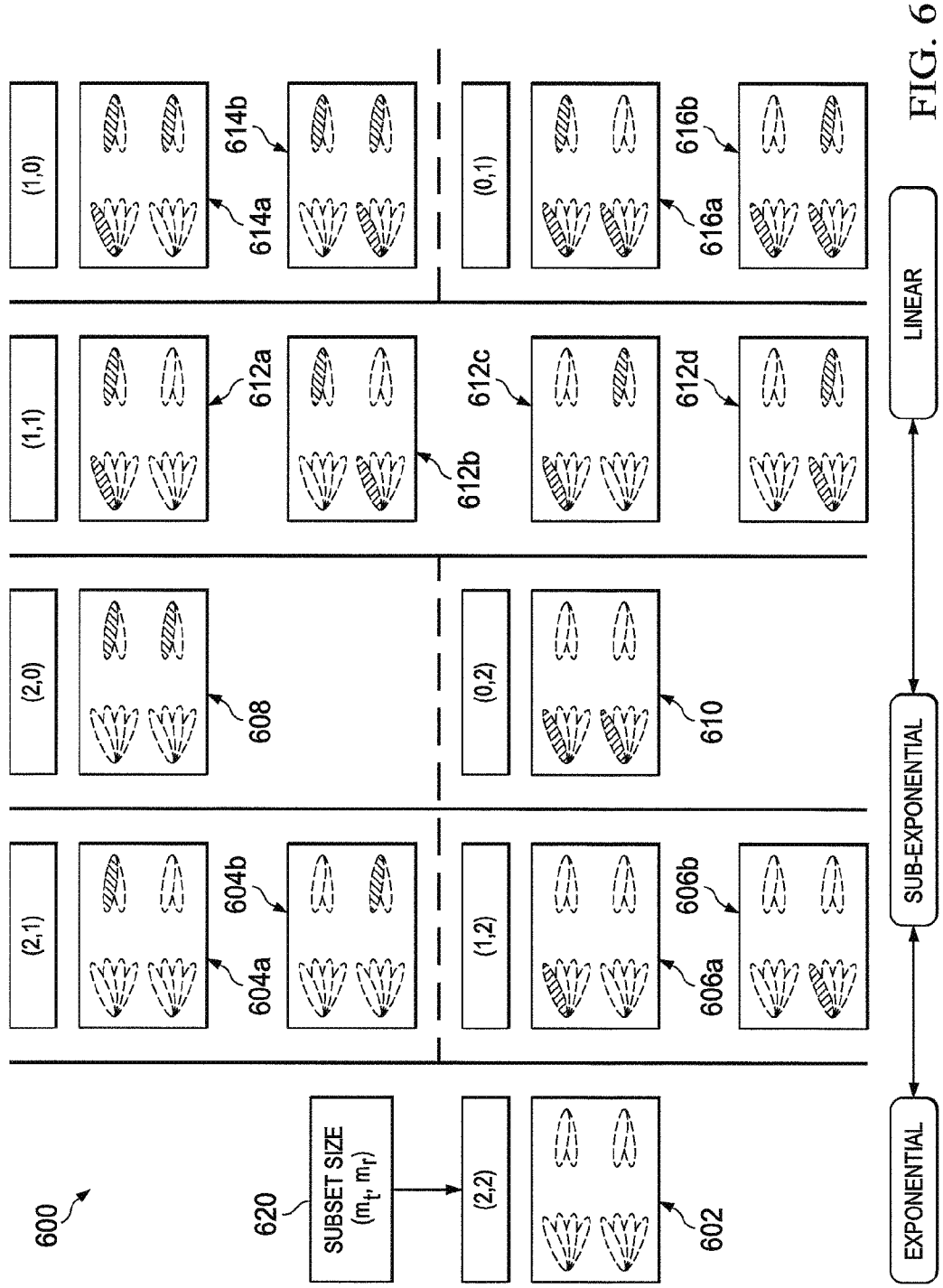
FIG. 6 illustrates example subsets according to this disclosure.

FIG. 6 illustrates example subsets 600 of TX and RX RF chains according to this disclosure. The embodiment of the system 600 illustrated in FIG. 6 is for illustration only. Subset 600 in FIG. 6 does not limit the scope of this disclosure to any particular implementation of the different combinations of subsets. In an embodiment, subsets 600 include subsets 602-616.

A subset size 620 may indicate a number of TX and RX RF chains that are selected for beam selection. Any RF chain outside of the subset may be initialized (or assigned) a beam while combinations of beams for RF chains within the subset exhaustively searched.

In an embodiment, subset 602 has a subset size of (2,2). Subset 602 has two TX RF chains and two RX RF chains. Accordingly, all of the RF chains are within the subset. When all RF chains are within the subset, the subset may be referred to as having exponential complexity.

In an embodiment, subset 604 has a subset size of (2,1). Subset 604 has two TX RF chains and two RX RF chains. Accordingly, all of the TX RF chains are within the subset, but only one RX RF chain may be within the subset. When not all RF chains are within the subset, but at least more than one RF chain of either the RX or TX is within the subset, the subset may be referred to as having sub-exponential complexity. In subset 604, there are two possible subset combinations, subset 604a and subset 604b. In one of more of the embodiments in this disclosure, the system compares the two subsets and chooses the one based on some metric.

In subset 604a, the upper right RX RF chain is initialized (or assigned) to a beam indicated by the solid oval. While the upper right RX RF chain is initialized, the remaining RF chains are iterated to identify desirable (or optimal) beams. Once the RF chains within the subset are identified, the remaining RF chain beams may be identified. In subset 606, the lower right RX RF chain is initialized.

Subsets 608 and 610 are examples when either only all the TX RF chains are in the subset or only all of the RX RF chains are within the subset. Subsets 612-616 show examples when one or less RF chains for each the TX and RX are within the subset. When one or less RF chains are within the subset for each of the TX and RX, then the subset may be referred to as having a linear complexity.

Subsets 612 may be considered to be jointly linear as only a single pair of TX and RX RF chains are in the subset at one time. Subsets 614-616 may be considered to be separately linear as only a single TX or RX RF chain is in the subset at one time.

In operational terminology, a RF beam-forming solution performs a joint or "set" RF beam search for all TX and RX RF chains together, which results in an exponential search complexity. One or more embodiments provide a reduced search complexity algorithm. The system performs a "subset" RF beam search by searching for the optimal RF beams from the codebook for a subset of TX and RX RF chains at a time while keeping the RF beams of the rest of the TX and RX RF chains fixed from the codebook. In general, there are multiple TX and RX RF chain subsets of the same size. From these different subsets, the system finds a desirable TX and RX RF chain subset and associated RF beams from the codebook based on the considered metric. The system then repeats this procedure for the different subsets of the remaining TX and RX RF chains the system finds the best RF beams for all TX and RX RF chains. The algorithm is iterated until it converges to a solution. The algorithm may be referred to as the subset RF beam search algorithm.

The algorithm may use two parameters:

The first parameter may be a performance metric. The algorithm allows different metrics to be used as objective function to make it adaptable to different optimization scenarios. In the general form of the algorithm, the notation F(.) is used to denote the performance metric. Metrics, such as single user channel capacity and SINR, are used to evaluate performance of the proposed algorithm.

The second parameter may be a RF chain subset size. In an example, $M^{RF}$ may be the set of TX and RX RF chain subset sizes $(m_t, m_r)$ considered in the proposed algorithm, where $m_t$ and $m_r$ respectively are the maximum numbers of TX and RX RF chains for which the system searches the optimal RF beams jointly at a time. The algorithm allows considering multiple TX and RX RF chain subset sizes. The number of different TX and RX RF chain subset sizes (excluding the empty set) is $(N_t+1)(N_r+1)-1$. The complexity of the proposed algorithm depends on the considered subset sizes. For example, when $(m_t, m_r)$ taken on values (1,0), (0,1) and (1,1), the proposed algorithm reduces to a linear RF beam search algorithms whereas when subset size is $(N_t, N_r)$, the algorithm becomes the optimal exponential RF beam search algorithm.

Figure 7:
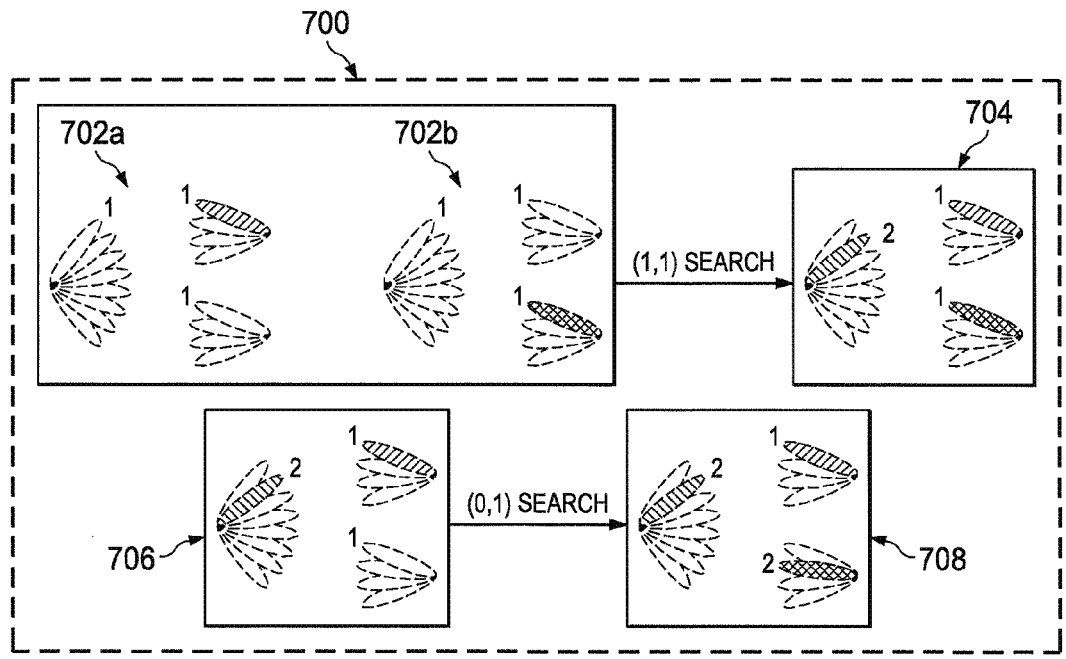
FIG. 7 illustrates example iteration of the beam selection process according to this disclosure.

FIG. 7 illustrates example iteration of the beam selection process 700 according to this disclosure. The embodiment of the process 700 illustrated in FIG. 7 is for illustration only. Process 700 in FIG. 7 does not limit the scope of this disclosure to any particular implementation of the process.

In process 700, an apparatus identifies (or searches) a desirable subset. The possible subsets are subset 702a and 702b. The apparatus may be a TX or RX. The size of the subset is (1,1). However, other sizes may be used. The apparatus may use a metric to select the desirable subset. For example, the desirable subset may be the subset with the best single user channel capacity or SINR.

In this example, subset 702b was the desirable subset. At 704, the apparatus has selected beam two for the TX RF chain and beam one for the upper right RX RF chain. During the selection process at 704, the lower right RX RF chain was initialized to beam one.

At 706, since the beams of the RF chains in the subset have been selected, the only remaining RF chain is the lower right RX RF chain. At 708, the lower right RX RF chain is searched and beam two is selected, while the other RF chains are initialized to their selected beams.

In an example embodiment, the performance metric F(.) and the RF chain subset size $M^{RF}$ are given. Without loss of generality, the F(.) may be non-negative. The algorithm therefore finds the TX and RX RF beam-forming solution which maximizes F(.). In an example, let $W_n$ and $V_n$ be the chosen RF beams from the codebook after the $n^{th}$ iteration of the algorithm. The RF beam update after the $(n+1)^{th}$ iteration is given by $(W_{n+1}, V_{n+1}) = U(F(.), W_n, V_n, M^{RF})$, where $U(F(.), W_n, V_n, M^{RF})$ is the RF beam update module summarized below in Table 1.

TABLE 1

Initialize: $S_t = \{1,...,N_t\}$; $S_r = \{1,...,N_r\}$; $W_{n+1} = W_n$; $V_{n+1} = V_n$
Iterate:
 While $S_t, S_r \neq \emptyset$
  val* = 0.0
  For $\forall (m_t, m_r) \in M^{RF}$
   $m_t \leftarrow \min(m_t, |S_t|)$
   $m_r \leftarrow \min(m_r, |S_r|)$
   For $\forall A \in S_t(m_t), \forall B \in S_r(m_r)$,
    For $\forall w_A \in C_t^{m_t}, \forall v_B \in C_r^{m_r}$
     $W = W_{n+1}$
     $V = V_{n+1}$
     $W(A) = w_A$
     $V(B) = v_B$
     val = $F(V^H H W)$
     If val > val*
      val* = val; $w_A^* = w_A$; $v_A^* = v_B$; A* = A; B* = B
    end TABLE 1-continued

```
        end
      end
    end
    $S_t = S_t \setminus \{A^*\}, S_r = S_r \setminus \{B^*\}$
    $W_{n+1}(A^*) = w_A^*$
    $V_{n+1}(B^*) = v_A^*$
end
```

The outer loop that allows iterative application of the RF beam update module is shown in Table 2.

In an embodiment, the performance and convergence speed of the proposed algorithm depends on the initial choice of RF beams $W_0$ and $V_0$. Depending on the chosen $W_0$ and $V_0$, the algorithm's convergence speed and optimality of the solution may vary. For example, some initializations may lead to quick convergence and globally optimal solutions whereas other initializations may converge to local optima.

TABLE 2

```
Initialization:
Initial RF beams: initialize RF beams for all TX and RX RF chains from
the codebook; let $W_0$ and $V_0$ be the initial beam-forming matrices
at the TX and at the RX, respectively.
Initial metric value: $opt_0 = F(V_0^H H W_0)$; $opt_{-1} = 0$
Convergence threshold: pick $opt_0 > \epsilon > 0$
Iteration:
n = 0
While $|opt_n - opt_{n-1}| > \epsilon$
    $(W_{n+1}, V_{n+1}) = U(F(.), W_n, V_n, M^{RF})$
    $n \leftarrow n + 1$
end
Solution: $W_n, V_n$
```

In some embodiments of this disclosure, there may be three initialization methods: random, best RF beam, and iterative. In other embodiments, more initialization methods may be used.

Figure 8:
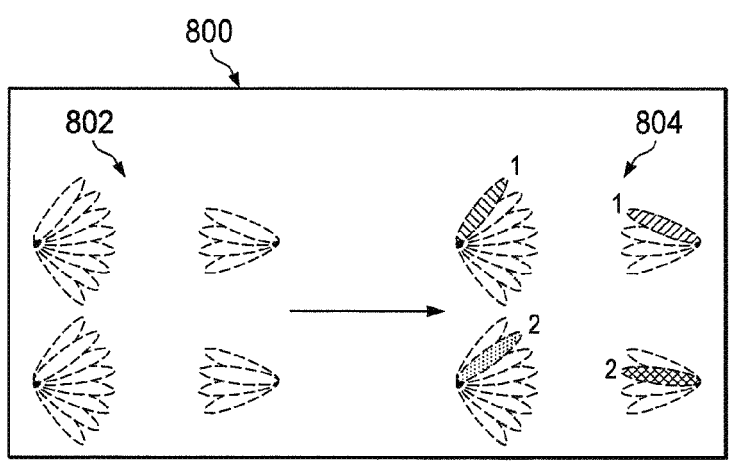
FIG. 8 illustrates an example random initialization process according to this disclosure.

FIG. 8 illustrates an example random initialization process 800 according to this disclosure. The embodiment of the process 800 illustrated in FIG. 8 is for illustration only. Process 800 in FIG. 8 does not limit the scope of this disclosure to any particular implementation of the process 800.

In this random initialization method, RF beams at all TX and RX RF chains are initialized using randomly chosen code words from the TX and RX RF codebooks.

In FIG. 8, the set 802 of RF chains may be un-initialized. A randomization process may be applied and the set 802 may be initialized to the set 804.

Figure 9:
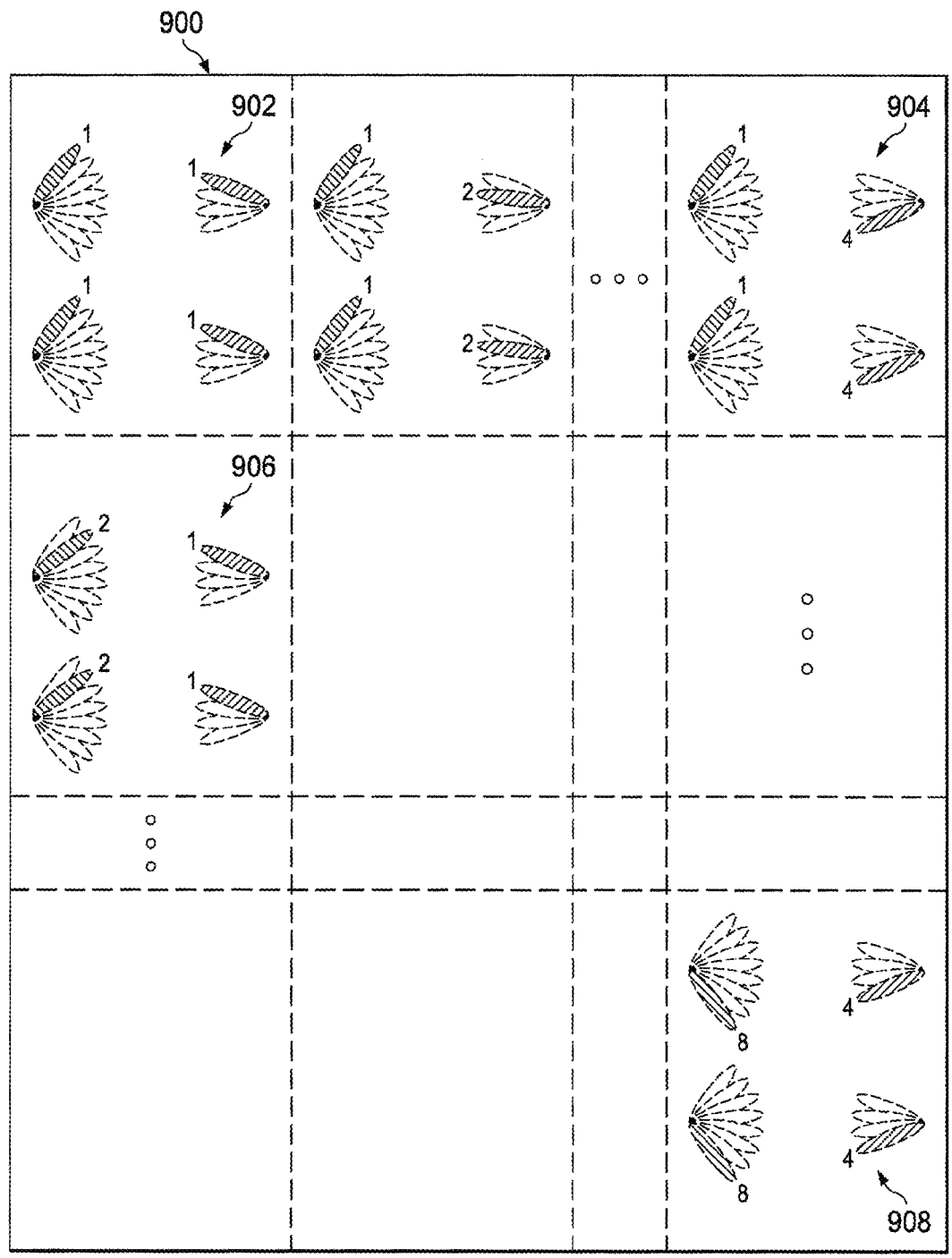
FIG. 9 illustrates an example best RF beam initialization process according to this disclosure.

FIG. 9 illustrates an example best RF beam initialization process 900 according to this disclosure. The embodiment of the process 900 illustrated in FIG. 9 is for illustration only. Process 900 in FIG. 9 does not limit the scope of this disclosure to any particular implementation of the process 900.

In best RF beam initialization, all TX and all RX RF chains are locked to a single RF beam from the codebook and the best TX and RX RF beam pair is obtained under this constraint. All TX and RX RF chains are initialized to the best RF beam pair thus obtained.

Table 3 summarizes this initialization method.

TABLE 3

```
val* = 0.0
For $\forall w \in C_t, \forall v \in C_r$
    W = 0
    V = 0
    $\forall i \in \{1, ..., N_t\}$ W(i) = w
```

TABLE 3-continued

```
    $\forall j \in \{1, ..., N_r\}$ V(j) = v
    val = $F(V^H H W)$
    If val > val*
        val* = val, $W_0 = W$; $V_0 = V$
    end
end
```

In FIG. 9, the set 902 of RF chains may be the one set where all beams are set to one. Set 904 shows a set where the TX beams remain at one and the RX beams are at four. In between sets 902 and 906 are the other possible variants of different RX beams being selected.

In this example, set 906 shows a set where the RX beams remain at one and the RX beams are at two. Further down the column of sets 902 and 906 are other variations of different beams selected for the RX.

All beam variations where the same beam is selected for all TX RF chains or RX RF chains are considered. Set 908 is an example of each TX and RX chain using the last beam.

FIG. 10 illustrates an example iterative initialization process 1000 according to this disclosure. The embodiment of the process 1000 illustrated in FIG. 10 is for illustration only. Process 1000 in FIG. 10 does not limit the scope of this disclosure to any particular implementation of the process 1000.

In iterative method, the system initializes TX and RX RF chains iteratively starting with the best TX and RX RF chain pair and the associated RF beam pair. From this initial choice of the RF chain and beam pairs, the system iterates among the remaining RF chains (and chain pairs) till the system finds the best beams for all TX and RX RF chains.

This initialization is equivalent to the following $$(W_0, V_0) = U(F(.), 0, 0, \{(1,1)\}).$$

In FIG. 10, the set 1002 of RF chains may search for the best pair. In this example, the best pair may be the upper left TX RF chain and the upper right RX RF chain as shown in set 1004. The remaining pair is initialized in set 1006.

One or more embodiments provides that for a given TX and RX RF chain subset size $(m_t, m_r)$, the complexity of the subset RF beam search algorithm is $$T = T_0 + O\left(\binom{N_t}{m_t}\binom{N_r}{m_r}|C_t|^{m_t}|C_r|^{m_r}k\right),$$

where $T_0$ is the complexity of the RF beam initialization method and k is the number of iteration until convergence. The complexity comparison for some values of $(m_t, m_r)$ is tabulated in Table 4.

One or more embodiments of this disclosure provide linear RF beam search algorithms and processes.

In two examples, there may be two linear algorithms depending on the considered value of the TX and RX RF chain subset size $(m_t, m_r)$. They are also listed in the first two rows of Table 4.

| $\{(m_t, m_r)\}$ | T | Type |
|---|---|---|
| $\{(1, 1)\}$ | $T_0 + O(N_t N_r |C_t||C_r|k)$ | Jointly Linear |
| $\{(0, 1), (1, 0)\}$ | $T_0 + O(\max(|C_t|N_t, N_r|C_r|)k)$ | Separately Linear |

-continued

| $\{(m_t, m_r)\}$ | T | Type |
|---|---|---|
| $\begin{cases} m_t \in (1, N_t), \\ m_r \in (1, N_r) \end{cases}$ | $T_0 + O\left(\binom{N_t}{m_t}\binom{N_r}{m_r}\|C_t\|^{m_t}\|C_r\|^{m_r}k\right)$ | Sub-exp. |
| $\{(N_t, N_r)\}$ | $O(\|C_t\|^{N_t}\|C_r\|^{N_r})$ | Exp. |

FIG. 11 illustrates an example of the two linear search processes 1100 according to this disclosure. The embodiment of the process 1100 illustrated in FIG. 11 is for illustration only. Process 1100 in FIG. 11 does not limit the scope of this disclosure to any particular implementation of the process 1100.

In an embodiment, if $(m_t, m_r) = (1,1)$, then the algorithm performs an iterative search over a pair of TX and RX RF chains that are chosen based on the performance metric keeping the beams at all other RF chains fixed and RF beam update module is completed when all pairs of TX and RX RF chains have optimal RF beams. We refer to this algorithm as the jointly linear RF beam search algorithm.

For example, sets 1102a-d are shown having $(m_t, m_r) = (1,1)$. Each set 1102a-d shows each possible candidate subsets of the chosen size $(1,1)$.

In an embodiment, if $\{(m_t, m_r)\} = \{(0,1), (1,0)\}$, the algorithm performs an iterative search over all TX and RX RF chains separately. From all TX and RX RF chains, the algorithm first finds the best RF chain and associated RF beam keeping the beams at all other RF chains fixed, then finds the next best RF chain and associated RF beam, and continues in this manner till the beams at all RF chains at both TX and RX have been optimized.

For example, sets 1104a-b are shown having $(m_t, m_r) = (1, 0)$. Each sets 1106a-b are shown having $(m_t, m_r) = (0,1)$.

Figure 12:
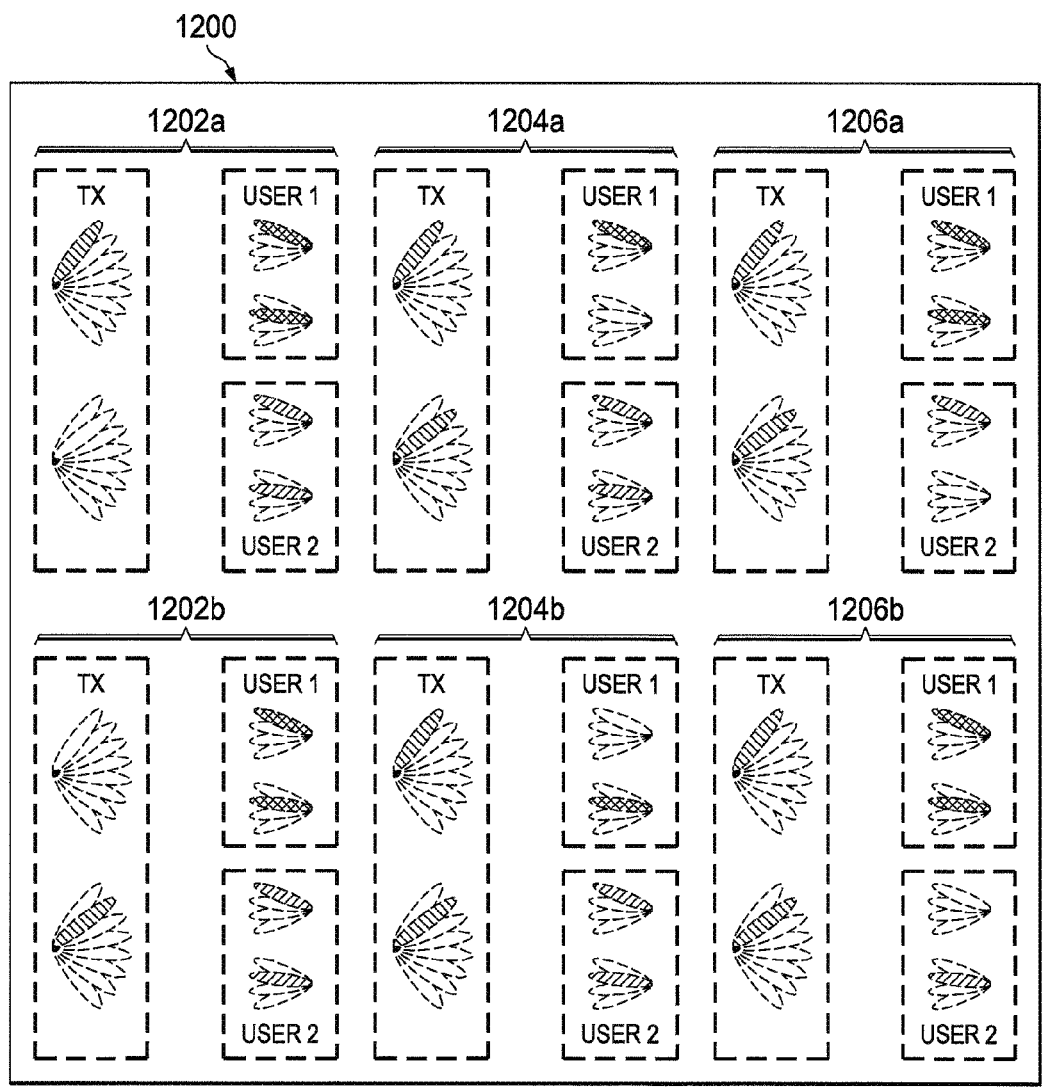
FIG. 12 illustrates an example of subset search for a multi user MIMO system 1200 according to this disclosure.

FIG. 12 illustrates an example of subset search for a multi user MIMO system 1200 according to this disclosure. The embodiment of the system 1200 illustrated in FIG. 12 is for illustration only. System 1200 in FIG. 12 does not limit the scope of this disclosure to any particular implementation of the system 1200.

In this example embodiment, the system may use the performance metric of:

$$F(\overline{H}_{eff}) = \log\det\left(I + \frac{1}{\sigma_n^2}\overline{H}_{eff}\overline{H}_{eff}^H\right),$$

where the effective MU channel $\overline{H}_{eff}$ obtained by stacking effective channels for all users together.

The RF chain subset size may be indicated by the notation of $$(m_t, m_{r_1}, m_{r_2}, \ldots, m_{r_{N_u}}).$$

For example, subset 1202 may have the notation (1,0,0) to indicate that only the TX includes a RF chain in the subset. There are two options, 1202a and 1202b. Likewise, 1204 and 1206 provide examples where an RF chain of a user (RX) is in the subset.

In an embodiment, having a system with MISO and SIMO, where there is just one RF chain at either TX or RX, the algorithm admits an intuitive interpretation. In an example, assuming that $N_t=2$ and $N_r=1$ and the following single user capacity formulation is metric, $$F(\overline{H}) = \log\det\left(I + \frac{1}{\sigma_n^2}\overline{H}\overline{H}^H\right), \quad (1)$$

where $\sigma_n^2$ is the variance of the additive white Gaussian noise and $\overline{H}=$ $$v_1^H H \begin{pmatrix} w_1 & 0 \\ 0 & w_2 \end{pmatrix},$$

the instantaneous baseband channel seen through receive RF Beam $v_1$, the instantaneous channel H and the transmit RF Beams $w_1$ and $w_2$. Since the system admits no rank greater than 1, maximizing the metric $F(\overline{H})$ is the same as maximizing the metric $\overline{HH}^H$ (equivalently written as $\|\overline{H}\|$).

For the (1,1) RF chain pair, $$(v_1^{1*} \quad w_1^*) = \operatorname{argmax}_{v_1, w_1} \left\| v_1^H H \begin{pmatrix} w_1 & 0 \\ 0 & 0 \end{pmatrix} \right\|.$$

Similarly, for the (2,1) RF chain pair, $$(v_1^{2*} \quad w_2^*) = \operatorname{argmax}_{v_1, w_2} \left\| v_1^H H \begin{pmatrix} 0 & 0 \\ 0 & w_2 \end{pmatrix} \right\|.$$

If $v_1^{1*} = v_1^{2*}$, then the solution is $(v_1^*, w_1^*, w_2^*)$. Otherwise, $$w_2' = \operatorname{argmax}_{w_2} \left\| v_1^{1*H} H \begin{pmatrix} w_1^* & 0 \\ 0 & w_2 \end{pmatrix} \right\|$$

and obtain the optimal value $a_1$. Likewise, $$w_1' = \operatorname{argmax}_{w_1} \left\| v_1^{2*H} H \begin{pmatrix} w_1 & 0 \\ 0 & w_2^* \end{pmatrix} \right\|$$

and obtain the optimal value $a_2$. If $a_2 > a_2$, then the solution is $(v_1^{1*}, w_1^*, w_2')$, otherwise it is $(v_1^{2*}, w_1', w_2^*)$.

Figure 13:
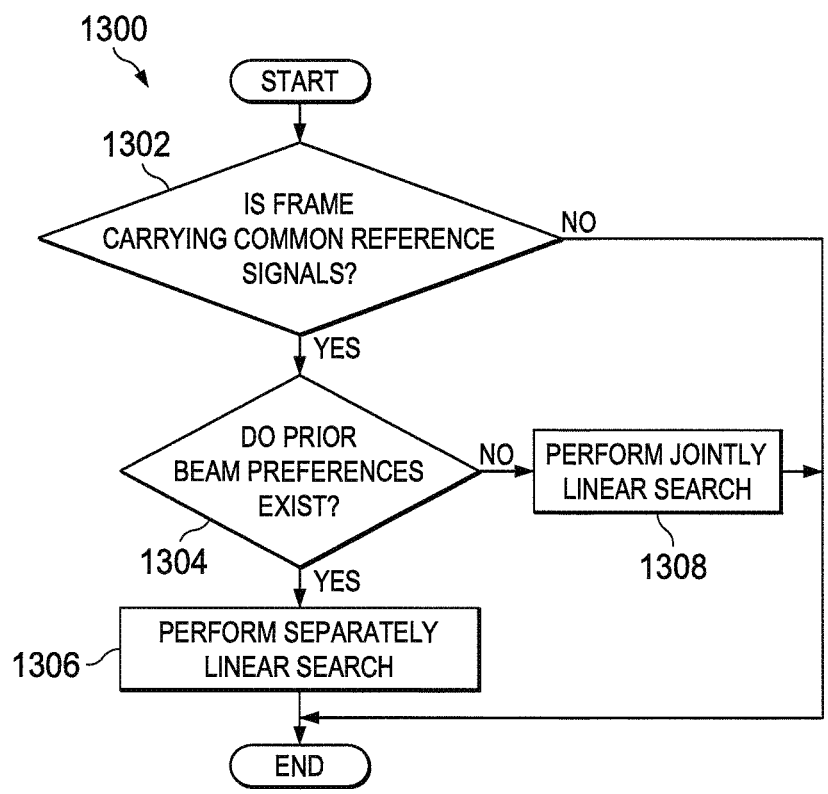
FIG. 13 illustrates an example process 1300 for further beam search complexity reduction according to this disclosure.

FIG. 13 illustrates an example process 1300 for further beam search complexity reduction according to this disclosure. The embodiment of the process 1300 illustrated in FIG. 13 is for illustration only. Process 1300 in FIG. 13 does not limit the scope of this disclosure to any particular implementation of the process 1300.

Process 1300 begins with operation 1302, where an apparatus identifies if a frame is carrying common reference signals. The apparatus may be, for example, a transmitter. If the frame is not carrying common reference signals, then the process 1300 terminates. If the frame is carrying common reference signals, then the apparatus determines, at operation 1304, whether prior beam preferences exist.

If prior beam preferences do exist, then the apparatus performs, at operation 1306, a separately linear search. The separately linear search algorithm may use the reference signal corresponding to beams that are spatially closer to the prior beam preferences. If the prior beam preferences do not exist, then the apparatus performs, at operation 1308, a jointly linear search. The jointly linear search may be performed over all received reference signals and the apparatus may identify selected beams corresponding to each digital chain and identify rank and channel quality index.

Figure 14:
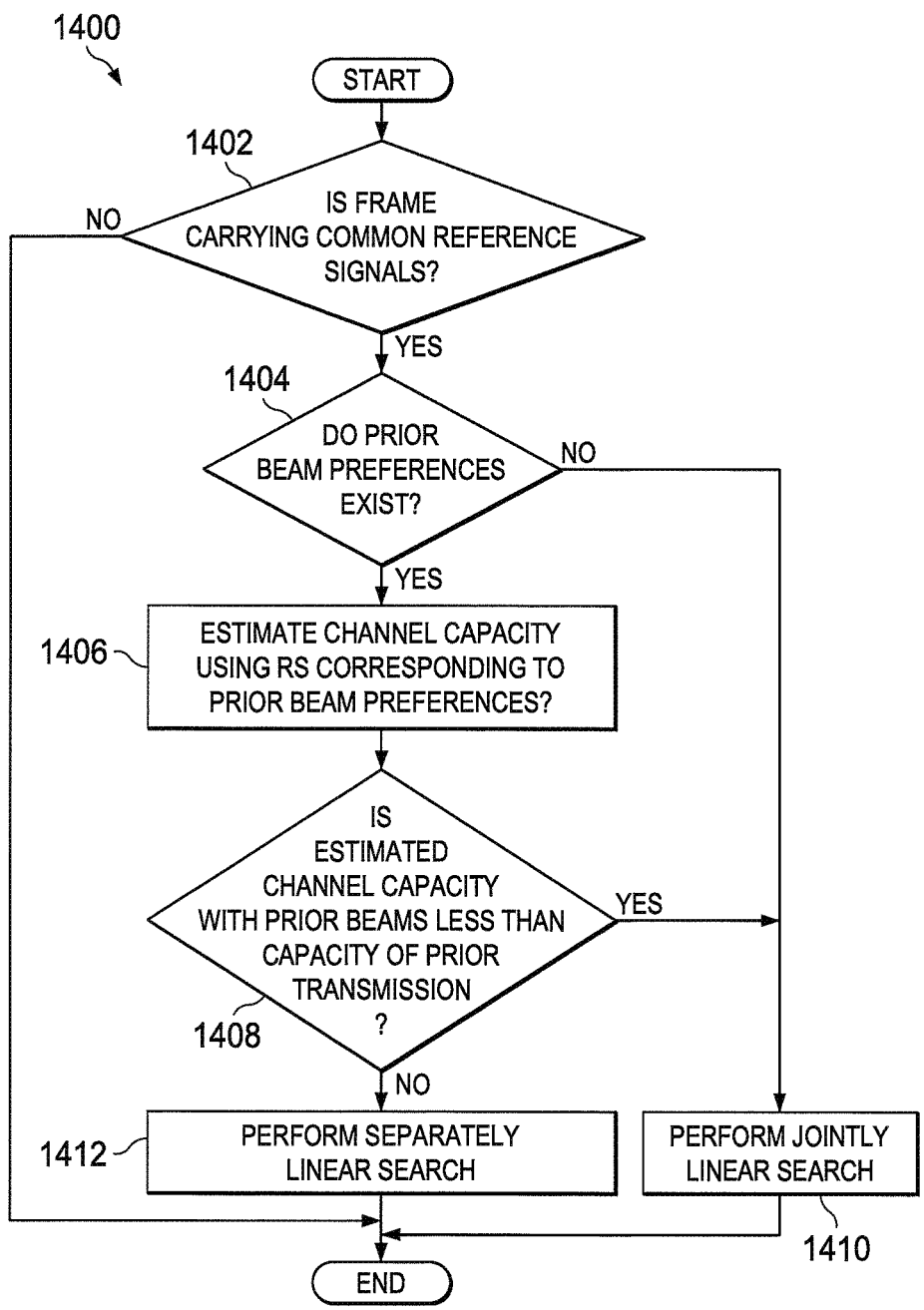
FIG. 14 illustrates an example process 1400 for further beam search complexity reduction according to this disclosure.

FIG. 14 illustrates another example process 1400 for further beam search complexity reduction according to this disclosure. The embodiment of the process 1400 illustrated in FIG. 14 is for illustration only. Process 1400 in FIG. 14 does not limit the scope of this disclosure to any particular implementation of the process 1400.

Process 1400 begins with operation 1402, where an apparatus identifies if a frame is carrying common reference signals. The apparatus may be, for example, a transmitter. If the frame is not carrying common reference signals, then the process 1400 terminates. If the frame is carrying common reference signals, then the apparatus determines, at operation 1404, whether prior beam preferences exist.

If prior beam preferences do exist, then the apparatus estimates, at operation 1406, a channel capacity using a reference signal corresponding to the prior beam preferences. If the prior beam preferences do not exist, then the apparatus performs, at operation 1410, a jointly linear search. The jointly linear search may be performed over all received reference signals and the apparatus may identify selected beams corresponding to each digital chain and identify rank and channel quality index.

At operation 1408, the apparatus determines if the estimated channel capacity with the prior beams is less than a capacity of a prior transmission. If the estimated channel capacity with the prior beams is less than a capacity of a prior transmission, then the apparatus performs, at operation 1410, a jointly linear search. If the estimated channel capacity with the prior beams is not less than a capacity of a prior transmission, then the apparatus performs, at operation 1412, a separately linear search. The separately linear search algorithm may use the reference signal corresponding to beams that are spatially closer to the prior beam preferences.

Figure 15:
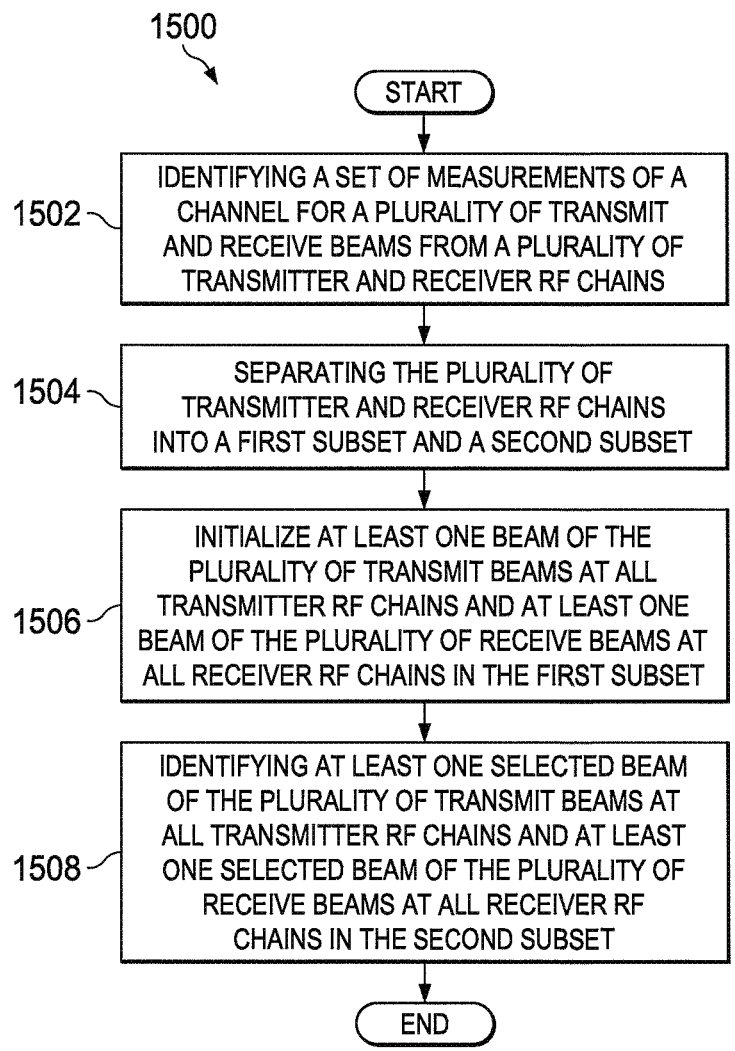
FIG. 15 illustrates an example of beam search at all transmitter and receiver RF chains according to this disclosure.

FIG. 15 illustrates an example process 1500 for an iteration type according to this disclosure. The embodiment of the process 1500 illustrated in FIG. 15 is for illustration only. Process 1500 in FIG. 15 does not limit the scope of this disclosure to any particular implementation of the process 1500.

Process 1500 begins with operation 1502, where an apparatus identifies a set of measurements of a channel for a plurality of transmit and receive beams from a plurality of transmitter and receiver RF chains. The apparatus may be, for example, a transmitter. The apparatus may include a control that is configured to execute instructions to carry out the operations below.

At operation 1504, the apparatus separates the plurality of transmitter and receiver RF chains into a first subset and the second subset. The second subset are the non-frozen RF chains while the first subset is the assigned (or initialized) RF chains that remain while the apparatus searches for a selected beam for each of the RF chains in the second subset.

At operation 1506, the apparatus initializes at least one beam of the plurality of transmit beams at all transmitter RF chains and at least one beam of the plurality of receive beams at all receiver RF chains in the first subset. The apparatus initializes the first subset RF chains while the second subset is searched. The initialized beams of the first subset may be "frozen" while the second subset is being searched.

At operation 1508, the apparatus identifies at least one selected beam of the plurality of transmit beams at all transmitter RF chains and at least one selected beam of the plurality of receive beams at all receiver RF chains in the second subset. The apparatus searches the second subset for a selected beam for each RF chain in the second subset.

Thereafter, the process 1500 may end or repeat for additional subsets.

For example, the apparatus may identify a maximum size of the second subset; identify a minimum size of the first subset to be equal to a number of the plurality transmitter and receiver RF chains minus a size of the first subset; and perform an inner iteration to update the at least one selected beam from a plurality of transmit and receive beams sequentially in subsets of the plurality of transmitter and receiver RF chains, wherein any beams of the plurality of receive beams of the remaining transmitter and receiver RF chains remain unchanged until all transmitter and receiver RF chains in the subsets are updated with the at least one selected beam from a plurality of transmit and receive beams.

Additionally, within the inner iteration, the apparatus may iterate over all possible subsets of the plurality transmitter and receiver RF chains comprising a size is equal to a second subset size; within the inner iteration, wherein any beams of the plurality of receive beams for all the possible subsets of the plurality transmitter and receiver RF chains whose size is equal to the size of the first subset remain unchanged; and perform an outer iteration to update the at least one selected beam from a plurality of transmit and receive beams to all transmitter and receiver RF chains based on the inner iteration.

Figure 16:
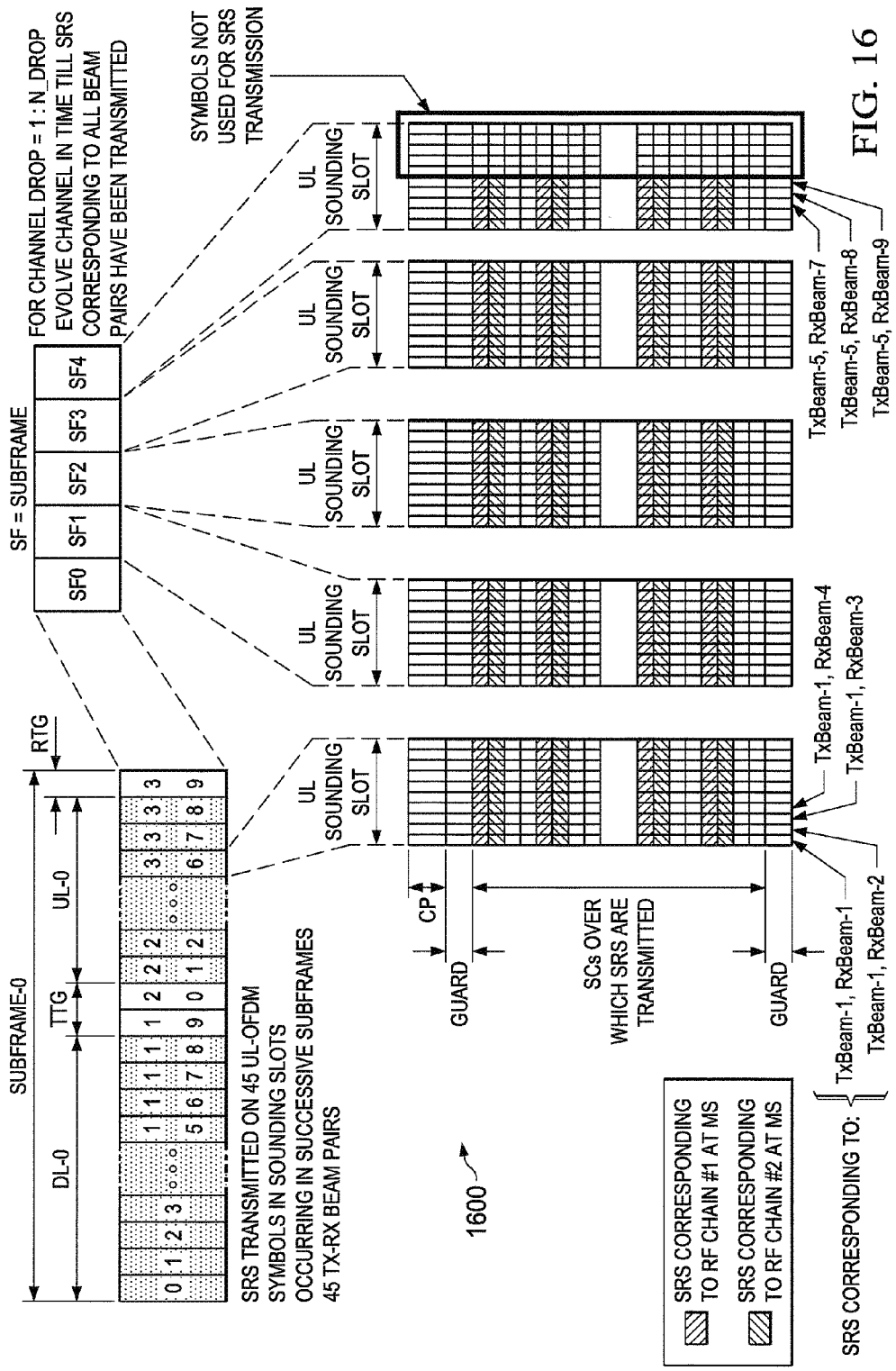
FIG. 16 illustrates an example sounding mechanism 1600 for millimeter wave cellular system.
Figure 17A:
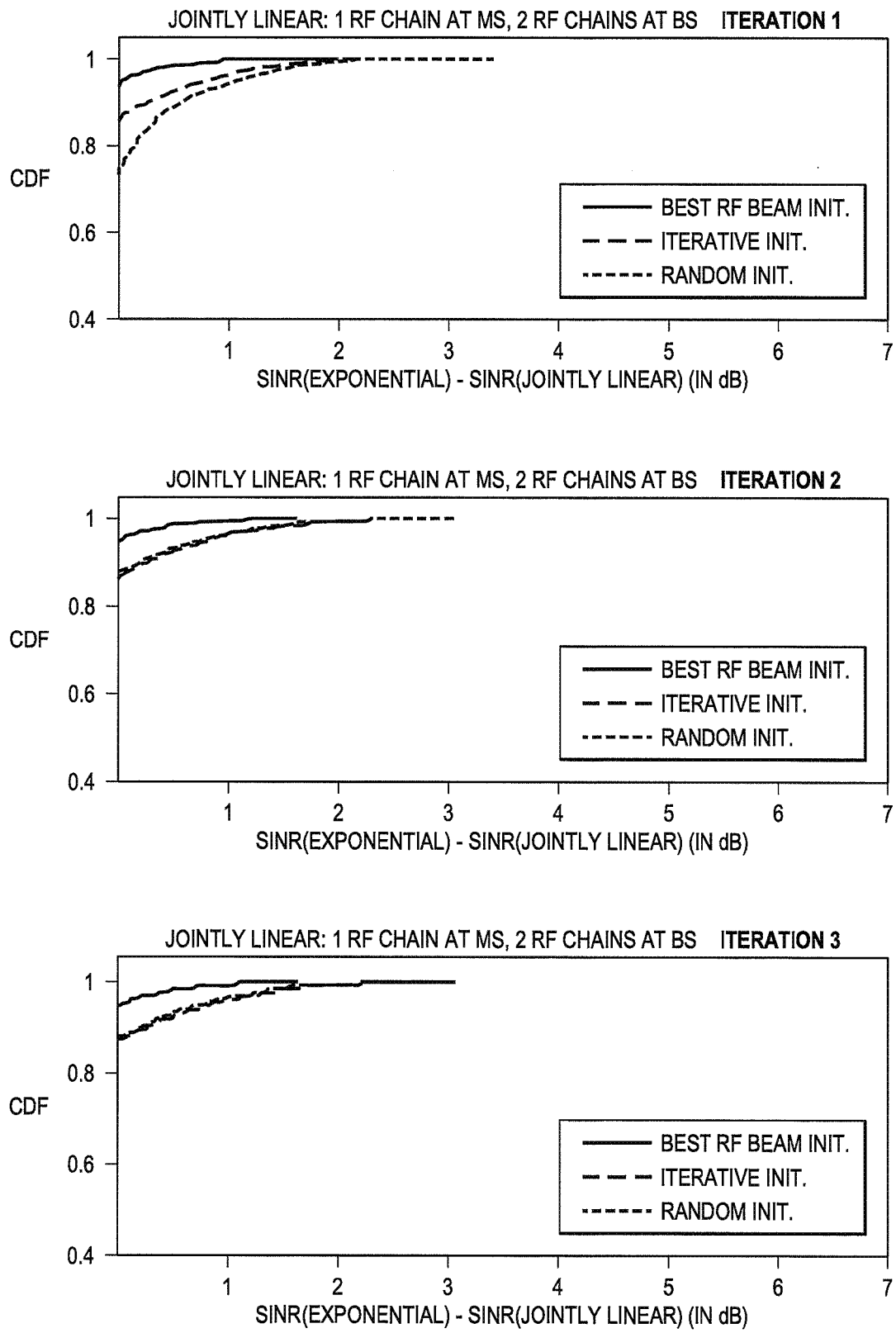
FIGS. 17A-H illustrates simulation results according to this disclosure.
Figure 17B:
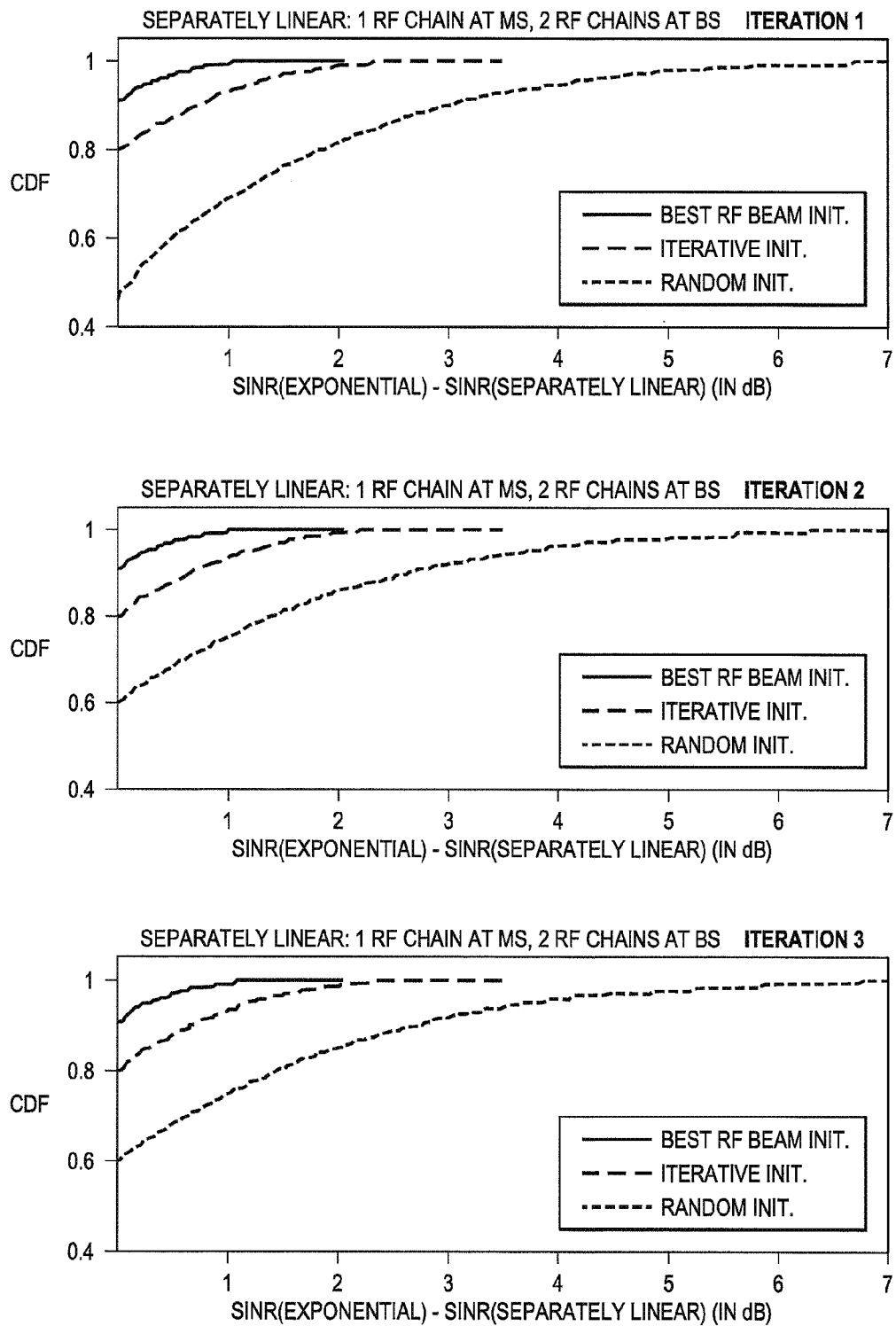
Figure 17C:
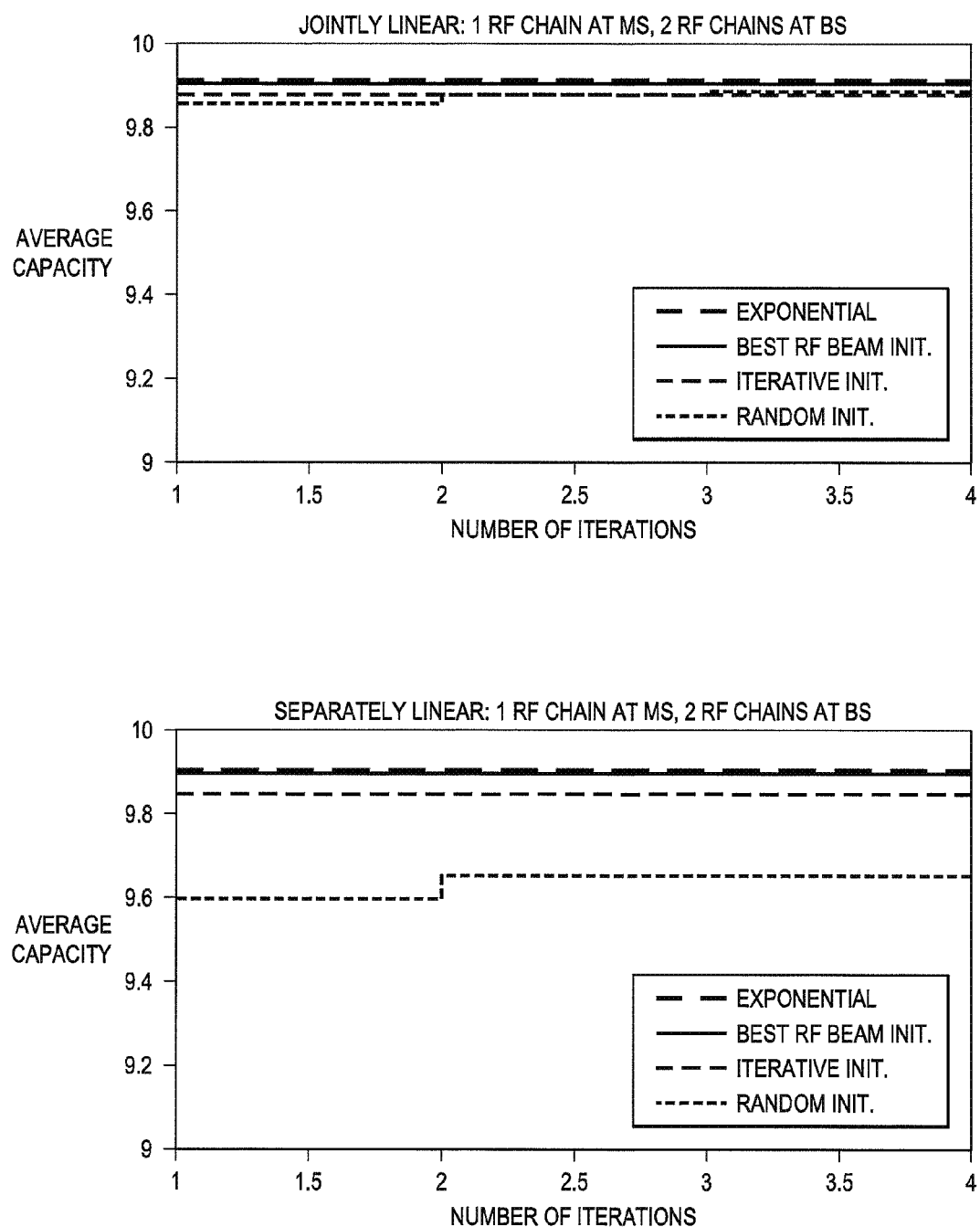
Figure 17D:
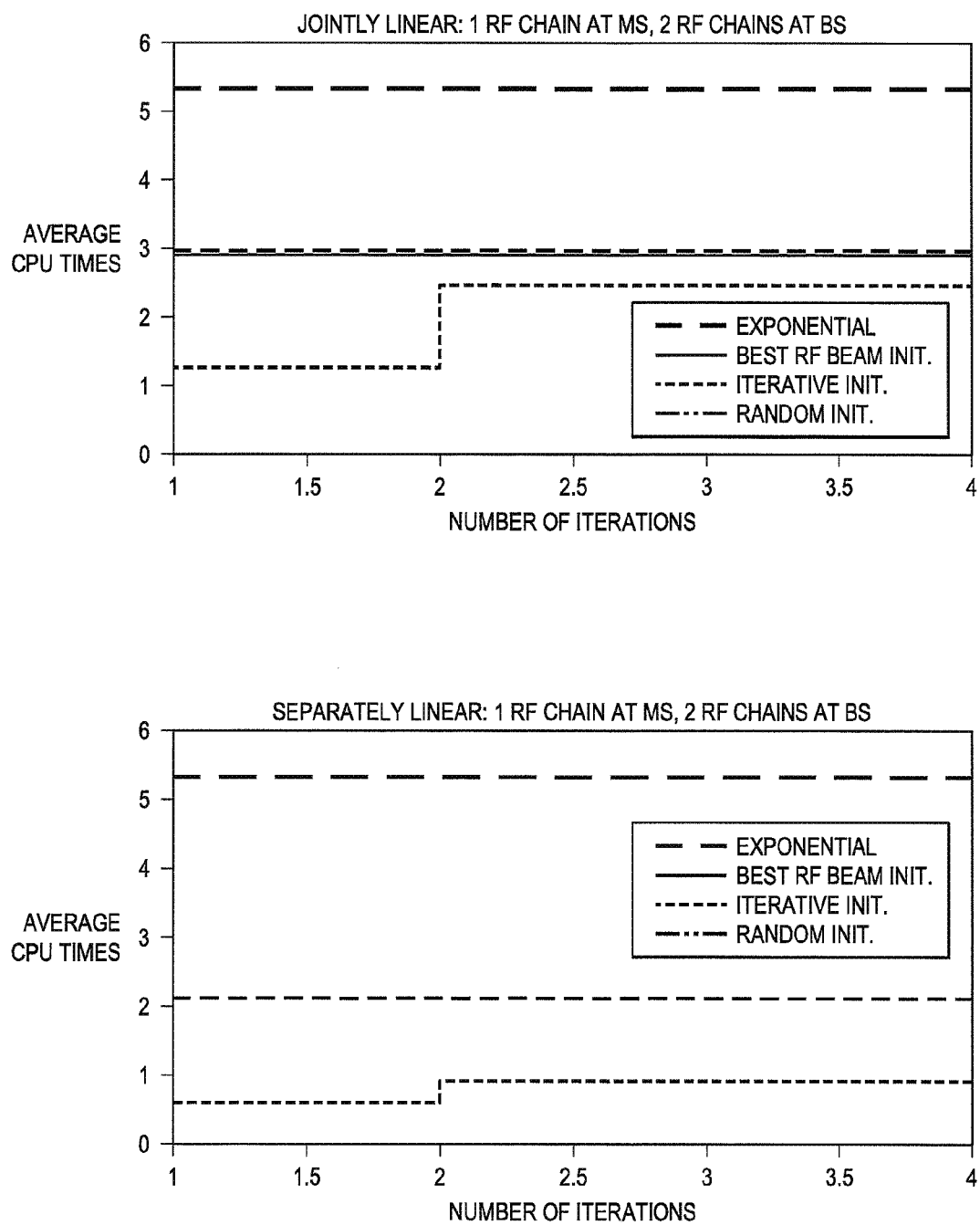
Figure 17E:
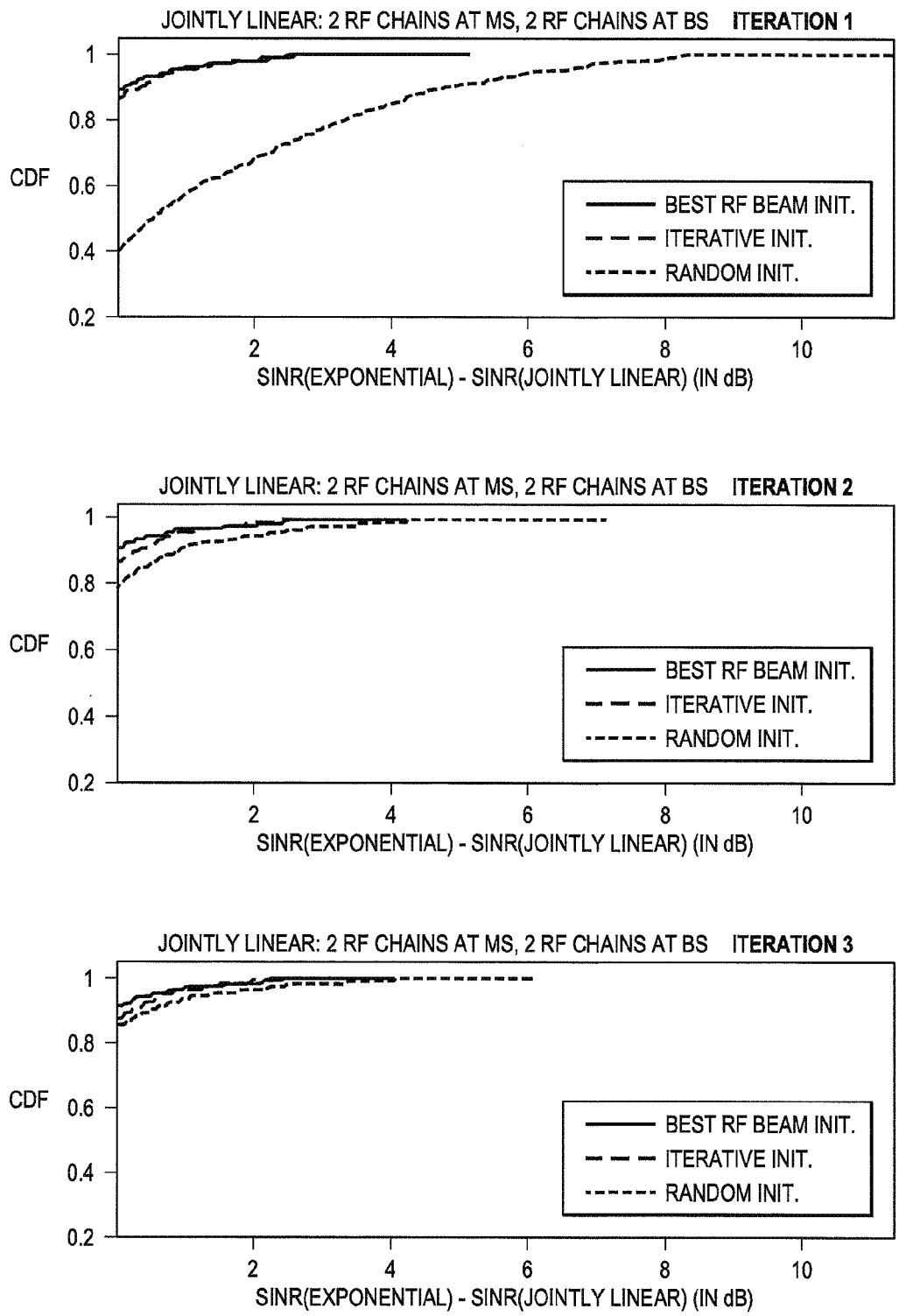
Figure 17F:
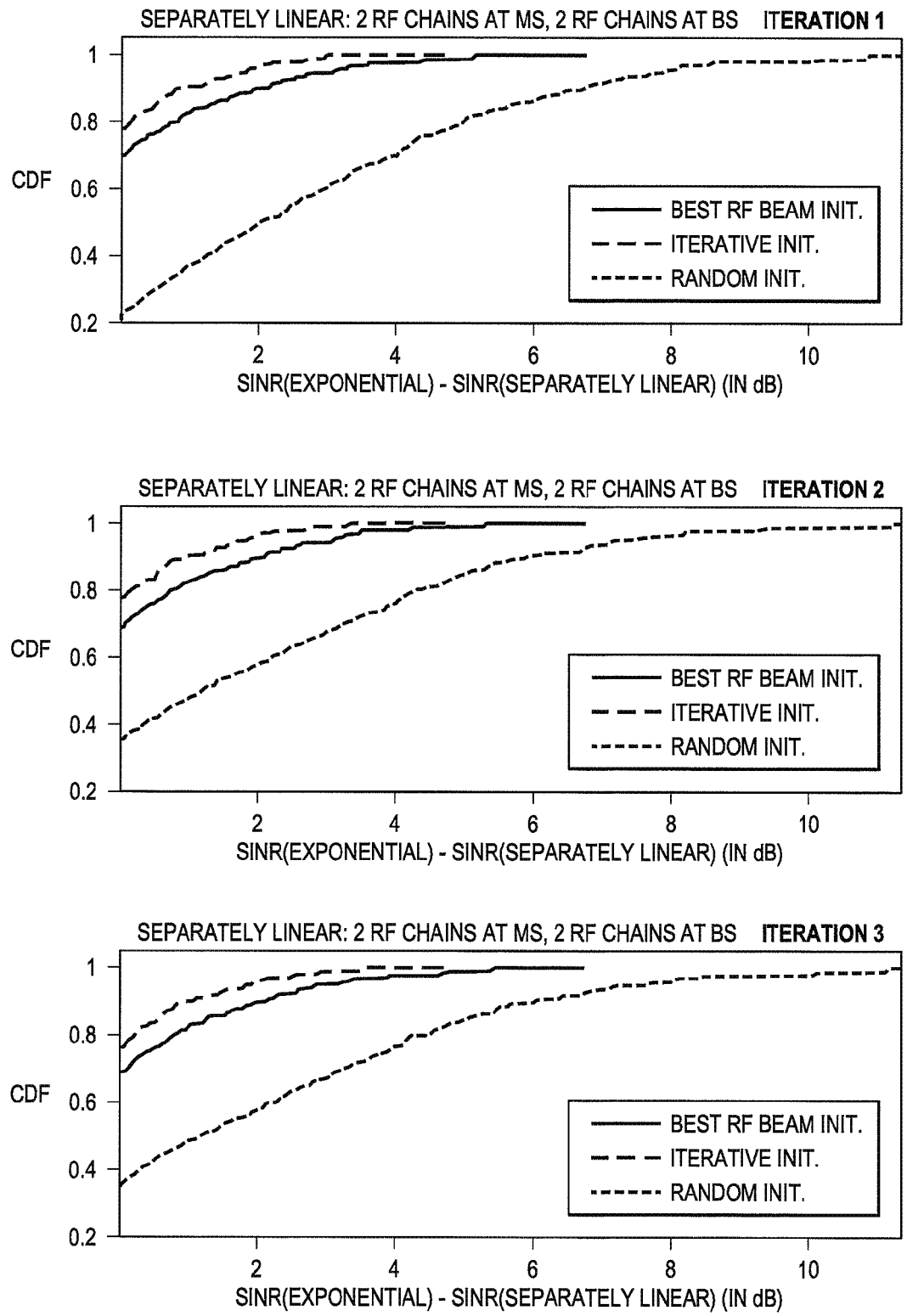
Figure 17G:
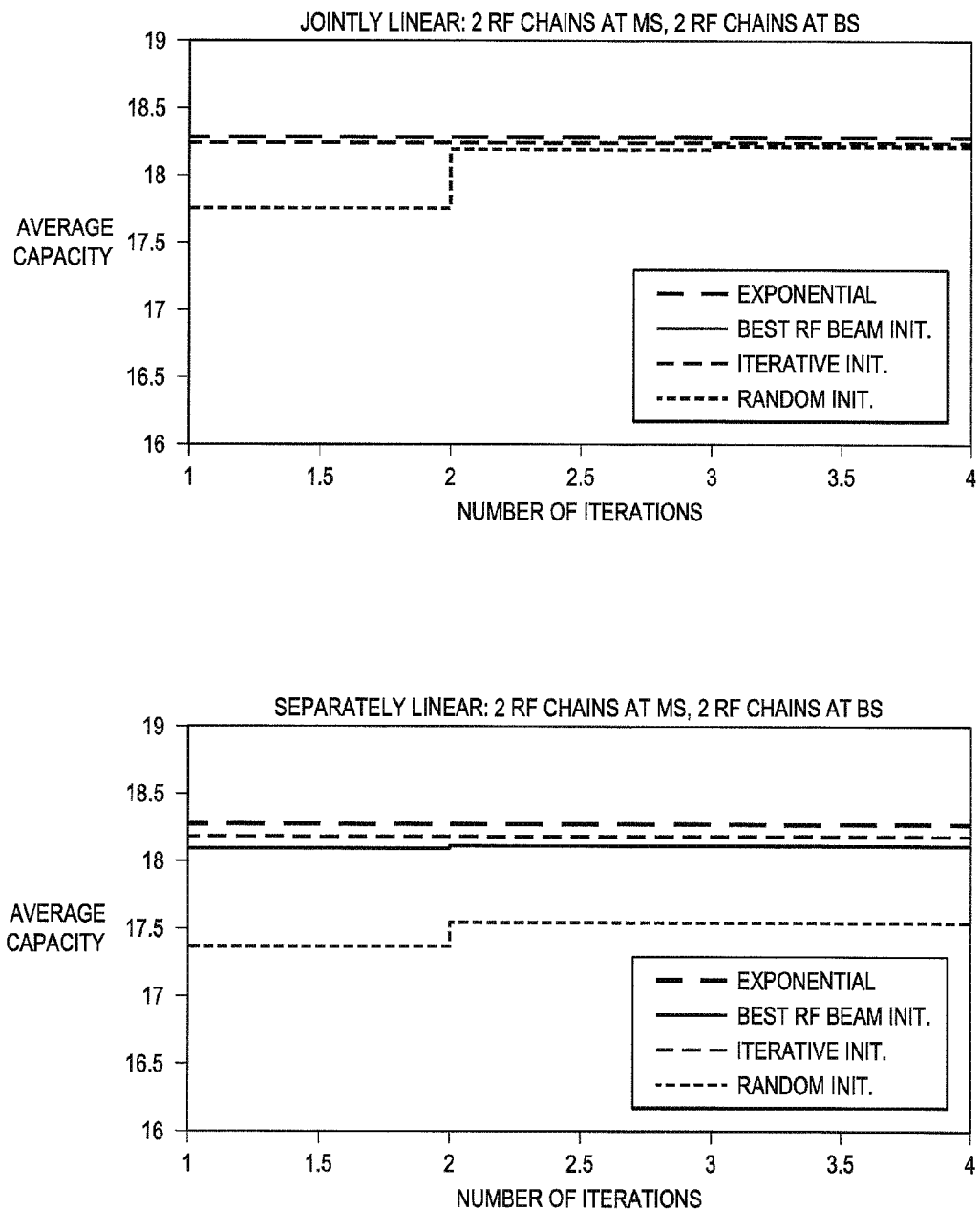
Figure 17H:
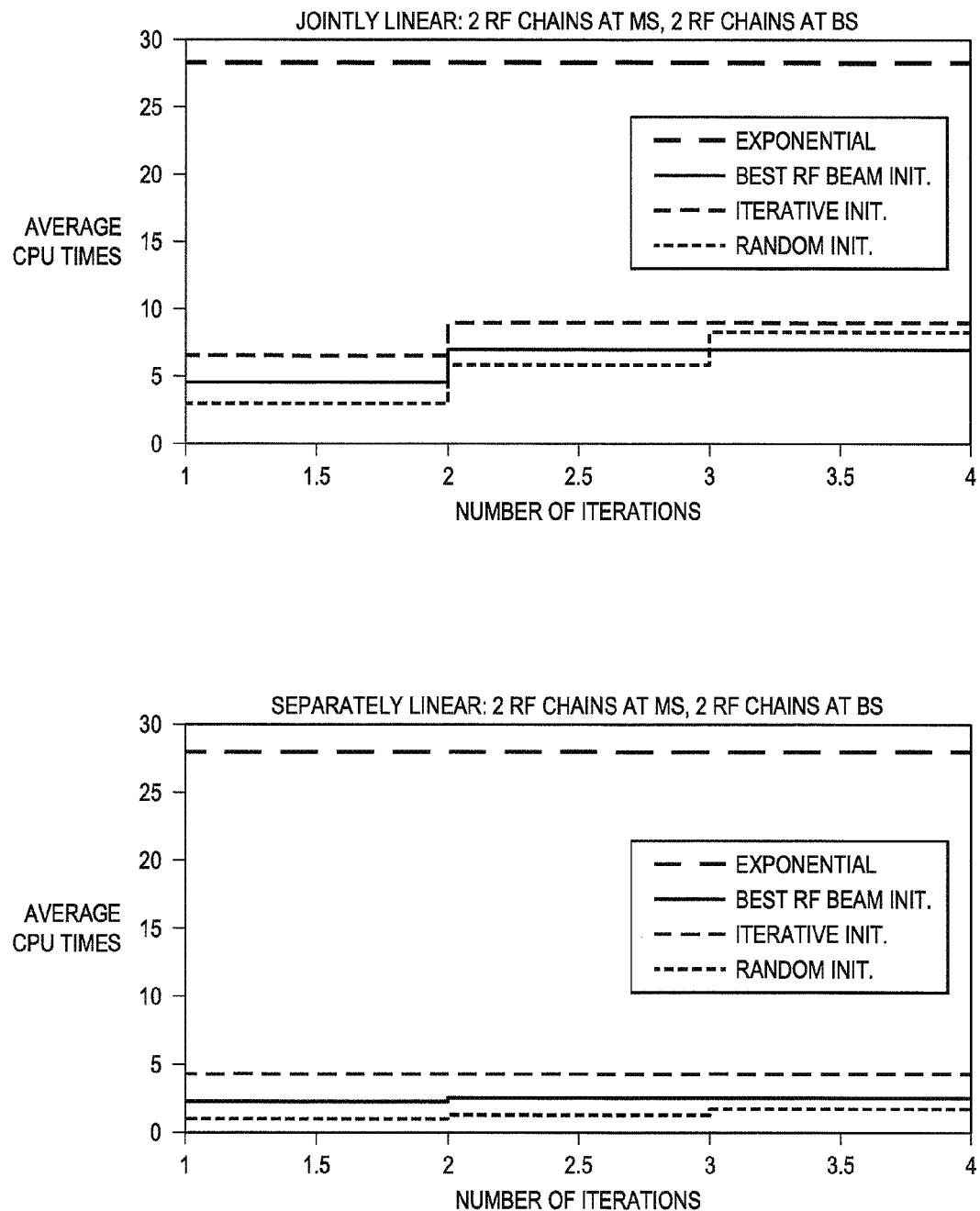

FIG. 16 illustrates an example sounding mechanism 1600 for a millimeter wave cellular communication system according to this disclosure. The embodiment of the sounding mechanism 1600 illustrated in FIG. 16 is for illustration only. Sounding mechanism 1600 in FIG. 16 does not limit the scope of this disclosure to any particular implementation of the sounding mechanism 1600. Elements of FIG. 16 may refer to elements of FIG. 5. For example, TxBeam-1 may refer to TX Beam 1 in FIG. 5.

One or more embodiments provide evaluating the linear beam search algorithm by simulating link level channel state acquisition using the sounding channel in a millimeter wave cellular environment. The simulation setup consisted of a base station (BS) with $N_{BS}=2$ RF chains, $N_{BS}^{RF}=8$ antennae per RF chain for a total of 16 antennae and a mobile station (MS) with $N_{MS}=1$ or 2 RF chains, $N_{MS}^{RF}=4$ antennae per RF chain. The BS supported $|C_{BS}|=9$ beams per RF chain and the MS, $|C_{MS}|=5$ beams per RF chain. The sounding mechanism for a millimeter wave system involves multiple OFDM symbols that carry sounding reference symbols (SRS) placed at regular intervals over the entire bandwidth from each transmit RF chain to be received by all receive RF chains so that channel can be measured for all $|C_{BS}|\times|C_{MS}|$ beam pairs from each transmit RF chain at all receive RF chains. Each OFDM symbol carrying SRS corresponds to a particular transmit beam for each RF chain at the MS and is received using a set of receive beams at all RF chains in the BS. For the system under consideration, 45 OFDM symbols may be used to scan SRS corresponding to 45 beam-pairs at every RF chain in the BS. The SRS corresponding to each RF chain in the MS are placed on adjacent resource elements and repeated at regular intervals as configured by the decimation factor for the sounding channel. The parameters used in the simulation platform are summarized in Table 5.

Although over-the-air SRS overhead is linear in the number of transmit digital chains and the number of beam pairs to be scanned, post-processing overhead of the SRS to determine the best RF beams for each transmit and receive RF chains is not. As mentioned above, the process involves an exponential search over $(|C_{BS}|)^{N_{BS}} \times (|C_{MS}|)^{N_{MS}}$ number of hypotheses built from the channel measurements. At high SINR, the multi-dimensional exponential search ensures an optimum set of RF beams to be used at each TX and RX RF chain that maximize the capacity metric in (1) for a given baseband channel realization $\bar{H}=V^H H W$. Since the performance of exponential search upper bounds the performance of the system, the performance of the proposed algorithm can be compared against the performance of exponential search at an SINR of 20 dB. The high SINR embodiment is to enable comparison against an optimum and is not a requirement for the algorithm.

TABLE 5

| Parameter | Value |
| --- | --- |
| Channel Model | 2D-SCM (UMi, 0 Kmph, NLOS) |
| Carrier Freq. | 28 GHz |
| Sampling Freq. | 1228.8 MHz |
| Bandwidth | 1000 MHz |
| Subcarrier Spacing | 300 KHz |
| FFT Size | 4096 |
| Sounding Symbol FFT Size | 2048 |
| Symbol Duration | 4.1667 μs |
| SRS Symbol Duration | 2.5 μs |
| # of Subcarriers per PRU | 20 |
| Max # of RBs | 96 |
| Sounding PRUs | Max # of RBs |
| BF Structure | Array of Subarrays |
| Array Structure | ULA |
| Antenna Spacing | (0.5λ) |
| Number of RF Chains | BS: $N_t = 2$<br>MS: $N_r = 2$ |
| # Ant. Elements (per RF chain) | BS: $N_t^{RF} = 8$<br>MS: $N_r^{RF} = 8$ |
| Quantized analog beam set | BS: $|C_r| = 9$<br>MS: $|C_t| = 5$ |
| Sounding Type | Decimation Spread |
| $N_b^{MS,s}(N_b^{BS})$ | All (All) |
| $1/\sigma_n^2$ (dB) | 20 dB |
| Beam Selection Metric | Max. Capacity |

The sounding channel is used to derive the instantaneous SINR over different granularities of the bandwidth that carry SRS. The estimated SINR is then used in scheduling decisions for the uplink transmission from the MS. The instantaneous SINR seen in the digital baseband is a function of transmit and receive beams chosen at each RF chain. The estimated SINR from the proposed beam search algorithm using the instantaneous capacity metric is compared with the optimal obtained from the exponential search. The cumulative distribution function (CDF) of the difference in the two SINR estimates is plotted to capture the distribution. If both the proposed beam search and the exponential search choose the same set of beams for all TX and RX RF chains, then the difference in the SINR is zero and if they disagree, the proposed beam search under-estimates the SINR compared to the optimal exponential search because the performance exponential search is an upper bound at high SINR. Therefore, the distribution of the difference in the two SINR estimates has support ≥0.

For the millimeter wave cellular system under consideration, the capacity metric satisfies non-negativity requirement of the objective function used for maximization as does the power metric described in the example for a MISO/SIMO system in Section 5.3. The general description of the metric is deliberately designed to accommodate situations like the RF beam search to support multi-user MIMO where the beam searches involves not only the different digital chains at TX and RX RF chains but across different users. One or more embodiments can extend the subset RF beam search algorithm for MU-MIMO by choosing the following two parameters of the algorithm appropriately.

Another consideration in fine-tuning the performance of the subset RF beam search algorithms, is the wireless medium which can vary depending on the environment and operating scenarios. In the simulation study, we consider a 19-tap Urban Micro SCM channel model REF6 which models an outdoor environment with a lot of scatterers. In some sense, the Urban Micro channel models a very challenging environment for a beam-formed system where the RF beams seek to orient the beams in the direction of the Eigen vectors of the channel. The large angular spreads at both the base station (±10°) and the mobile station (±22°) spread the tap energy across multiple RF beam directions and a particular RF beam choice captures only a fraction of the energy from the different paths. However, in sparser channels with smaller angular spreads, beam-forming can leverage the directionality of the instantaneous channel and show superior performance. The linear RF beam search algorithms can also be fine-tuned to process only a subset of directions from the directions scanned.

One or more embodiments propose a class of RF beam search algorithms with three different initializations for systems involving multiple TX and RX RF chains. The algorithms proposed have varying complexities ranging from sub-exponential to linear. In one or more example embodiments, two classes of linear algorithms are shown, jointly linear and separately linear, whose performance was evaluated in a millimeter wave cellular setting that involved sounding RS transmission from the mobile station to the base station to enable support of single user MIMO. Evaluating the algorithm with metrics such as the instantaneous SINR, average capacity, and average CPU time, identifies the jointly linear algorithm with best RF beam initialization to offer the best tradeoff between performance and complexity when compared to the optimal exponential search.

FIGS. 17A-H illustrates simulation results according to this disclosure. The embodiment of the simulation results illustrated in FIGS. 17A-H is for illustration only. Simulation results in FIGS. 17A-H do not limit the scope of this disclosure to any particular implementation.

One or more embodiments provides a communication system in which a transmitter (TX) communicates with a receiver (RX) using multiple antennae with hybrid (RF and digital) beam-forming structure in which both TX and RX have multiple RF chains, each TX and RX RF chain forms an RF beam from a set of RF beams (RF codebook), TX transmits reference signals (RS) using all supported TX RF beams at all TX RF chains and RX measures these RS using all supported RX RF beams at all RX RF chains, and RX performs TX and RX RF beam selection using all available RS measurements.

In an example embodiment of one or more embodiments above, the TX and RX RF beam selection is performed iteratively over subsets of TX and RX RF chains where the size of the subset is between zero and number of TX and RX RF chains, and over subsets of TX and RX RF beams where the size of the subset is between zero and number of supported TX and RX RF beams, based on any SU-MIMO communication metric such as capacity, norm, SINR, and the like.

In an example embodiment of one or more embodiments above, the size of the subset of RF chains is at most one. For example, if the system is jointly linear, the size of subsets of both TX and RX RF chains is one, if the system is separately linear, the size of subsets of one of TX and RX RF chains is one.

In an example embodiment of one or more embodiments above, before starting the iteration, RF beams at all TX and RX RF chains are initialized to RF beams either randomly from TX and RX RF beam codebooks, or using the best RF beam method in which all TX and RX RF chains are initialized to the "best" TX and RX RF beam pair based on any metric, obtained by locking all TX (RX) RF chains to the same beam from TX (RX) RF codebook, or using the iterative method in which all TX and RX RF chains are initialized iteratively in TX and RX RF chain pairs starting from the best pair based on any metric.

In an example embodiment of one or more embodiments above, the system performs rank adaptation either by performing an outer optimization over all possible ranks or by optimizing rank at each step of the iteration. In some methods, the rank adaptation is performed together with the inner iteration of the disclosed subset RF beam search algorithm. In some methods, the rank adaptation is performed together with the outer iteration of the disclosed subset RF beam search algorithm. In some method, the rank adaptation uses the rank dependent digital pre-coder at the transmitter, which is either codebook based or non-codebook based.

In an example embodiment of one or more embodiments above, in a MU-MIMO system, where there are multiple RXs and TXs, the system performs TX and RX RF beam selection iteratively over a subset of TX RF chains and subsets of RX RF chains for all RXs, where the size of the subset is between zero and number of RF chains, and over a subset of TX RF beams and subsets of RX RF beams for all RXs, where the size of the subset is between zero and number supported TX and RX RF beams, based on any MU-MIMO communication metric such as total MU capacity, sum capacity, and the like.

In an example embodiment of one or more embodiments above, the specific class of algorithm (RF chain subset size) is determined based on prior beam preferences to facilitate further overhead reduction.

In an example embodiment of one or more embodiments above, the TX gathers RF beam selection reports from multiple RXs and uses them to perform SU/MU scheduling.

In one or more embodiments, given a set of measurements of the channel for a set of transmit and receive beams from different transmit and receive radio frequency chains, a method used in a device to find a particular selected transmit beam for a transmit radio frequency chain and a particular selected receive beam for a receive radio frequency chain until all radio frequency chains at the transmitter and receiver have selected beams associated with them.

In an example embodiment of one or more embodiments above, the selected set of beams at the transmitter and receiver radio frequency chains are chosen to maximize a metric that is a function of the measured channel.

In an example embodiment of one or more embodiments above, the function used is the channel capacity.

In an example embodiment of one or more embodiments above, the search for a set of selected beams at both the transmitter and receiver radio frequency chains is performed over a subset of radio frequency chains where the subset does or does not include all radio frequency chains together at the transmitter and receiver.

In an example embodiment of one or more embodiments above, the search for a set of selected beams in a subset of radio frequency chains involves choosing the selected beam over all the measured beams that maximize the capacity metric while keeping the beams fixed on the radio frequency chains that are not in the subset In an example embodiment of one or more embodiments above, the size of the subset indicating the number of radio frequency chains is fixed.

In an example embodiment of one or more embodiments above, the selected beams for each of the different possible subsets of radio frequency chains are found by an iterative procedure until the chosen metric is maximized.

In an example embodiment of one or more embodiments above, the size of the subset of RF chains over which the beam search is carried out is chosen separately at both the transmitter and the receiver.

In an example embodiment of one or more embodiments above, the size of the subset of RF chains over which the beam search is carried out can be set to either 1 at the transmitter and 0 at the receiver or 0 at the transmitter and 1 at the receiver.

In an example embodiment of one or more embodiments above, the size of the subset of RF chains over which the beam search is carried out can be set to 1 at the transmitter and 1 at the receiver.

In an example embodiment of one or more embodiments above, all TX and RX RF chains are initialized to the "best" TX and RX RF beam pair based on a metric that is a function of the measured channel and is obtained by locking all TX (RX) RF chains to the same beam from TX (RX) RF codebook and choosing a TX and RX beam that maximized the said metric.

In an example embodiment of one or more embodiments above, all TX and RX RF chains are initialized iteratively in TX and RX RF chain pairs starting from the best pair based on a metric that is maximized.

In an example embodiment of one or more embodiments above, rank adaptation is incorporated by performing an outer optimization over all possible ranks or by optimizing rank at each step of the iteration based on the method in claim 1.

In an example embodiment of one or more embodiments above, a transmitter gathers selected RF beam selection reports from multiple RXs and uses them to perform SU/MU scheduling.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for communicating in a wireless network with a plurality of transmitter radio frequency (RF) chains and a plurality of receiver RF chains, the method comprising:
   identifying a set of measurements of a channel for a plurality of transmit and receive beams from the plurality of transmitter and receiver RF chains;
   separating the plurality of transmitter and receiver RF chains into a first subset and a second subset;
   initializing at least one beam of the plurality of transmit beams at all transmitter RF chains and at least one beam of the plurality of receive beams at all receiver RF chains in the first subset; and
   identifying at least one selected beam of the plurality of transmit beams at all transmitter RF chains and at least one selected beam of the plurality of receive beams at all receiver RF chains in the second subset.

2. The method of claim 1, further comprising:
identifying a maximum size of the second subset;
identifying a minimum size of the first subset to be equal to a number of the plurality transmitter and receiver RF chains minus a size of the first subset; and
performing an inner iteration to update the at least one selected beam from a plurality of transmit and receive beams sequentially in subsets of the plurality of transmitter and receiver RF chains, wherein any beams of the plurality of receive beams of the remaining transmitter and receiver RF chains remain unchanged until all transmitter and receiver RF chains in the subsets are updated with the at least one selected beam from a plurality of transmit and receive beams.

3. The method of claim 2, further comprising:
within the inner iteration, iterating over all possible subsets of the plurality transmitter and receiver RF chains comprising a size is equal to a second subset size;
within the inner iteration, wherein any beams of the plurality of receive beams for all the possible subsets of the plurality transmitter and receiver RF chains whose size is equal to the size of the first subset remain unchanged; and
performing an outer iteration to update the at least one selected beam from a plurality of transmit and receive beams to all transmitter and receiver RF chains based on the inner iteration.

4. The method of claim 1, where the at least one selected beam at the plurality of transmitter and receiver RF chains is chosen to maximize a metric that is a function of the channel.

5. The method of claim 4, wherein the function is the channel capacity.

6. The method of claim 1, wherein identifying the at least one selected beam comprises:
determining the selected beam that maximizes a capacity metric.

7. The method of claim 1, wherein the second subset size comprises a transmitter size and a receiver size, and wherein identifying the size of the second subset comprises:
identifying the transmitter size separate from the receiver size.

8. The method of claim 1, wherein initializing the at least one beam comprises:
initializing at least one beam pair based on a metric that is a function of the measured channel and by initializing all the transmitter and receiver RF chains to a same beam.

9. The method of claim 1, wherein initializing the at least one beam comprises:
initializing the at least one beam iteratively in the transmitter and receiver RF chains beginning with a pair maximizing a metric.

10. The method of claim 3, wherein iterating over all the possible subsets comprises:
iterating over all the possible subsets of all possible ranks of the plurality of transmitter and receiver RF chains for the size to identify the first and second subsets.

11. The method of claim 1, further comprising:
receiving a plurality of RF beam selection reports; and
scheduling single user or multi user using the plurality of RF beam selection reports.

12. An apparatus, comprising:
a controller, being implemented with hardware, configured to:
identify a set of measurements of a channel for a plurality of transmit and receive beams from the plurality of transmitter and receiver RF chains;
separate the plurality of transmitter and receiver RF chains into a first subset and a second subset;
initialize at least one beam of the plurality of transmit beams at all transmitter RF chains and at least one beam of the plurality of receive beams at all receiver RF chains in the first subset; and
identify at least one selected beam of the plurality of transmit beams at all transmitter RF chains and at least one selected beam of the plurality of receive beams at all receiver RF chains in the second subset.

13. The apparatus of claim 12, wherein the controller is further configured to:
identify a maximum size of the second subset;
identify a minimum size of the first subset to be equal to a number of the plurality transmitter and receiver RF chains minus a size of the first subset; and
perform an inner iteration to update the at least one selected beam from a plurality of transmit and receive beams sequentially in subsets of the plurality of transmitter and receiver RF chains, wherein any beams of the plurality of receive beams of the remaining transmitter and receiver RF chains remain unchanged until all transmitter and receiver RF chains in the subsets are updated with the at least one selected beam from a plurality of transmit and receive beams.

14. The apparatus of claim 12, wherein the controller is further configured to:
within the inner iteration, iterating over all possible subsets of the plurality transmitter and receiver RF chains comprising a size is equal to a second subset size;
within the inner iteration, wherein any beams of the plurality of receive beams for all the possible subsets of the plurality transmitter and receiver RF chains whose size is equal to the size of the first subset remain unchanged; and
performing an outer iteration to update the at least one selected beam from a plurality of transmit and receive beams to all transmitter and receiver RF chains based on the inner iteration.

15. The apparatus of claim 12, where the at least one selected beam at the plurality of transmitter and receiver RF chains is chosen to maximize a metric that is a function of the channel.

16. The apparatus of claim 15, wherein the function is the channel capacity.

17. The apparatus of claim 12, wherein identifying the at least one selected beam comprises:
determine the selected beam that maximizes a capacity metric.

18. The apparatus of claim 12, wherein the second subset size comprises a transmitter size and a receiver size, and wherein identifying the size of the second subset comprises:
identify the transmitter size separate from the receiver size.

19. The apparatus of claim 12, wherein initializing the at least one beam comprises the controller configured to:
initialize at least one beam pair based on a metric that is a function of the measured channel and by initializing all the transmitter and receiver RF chains to a same beam.

20. The apparatus of claim 12, wherein initializing the at least one beam comprises the controller configured to:
initialize the at least one beam iteratively in the transmitter and receiver RF chains beginning with a pair maximizing a metric.

21. The apparatus of claim 14, wherein iterating over all the possible subsets comprises the controller configured to:

iterate over all the possible subsets of all possible ranks of the plurality of transmitter and receiver RF chains for the size to identify the first and second subsets.

22. The apparatus of claim 12, wherein the controller is further configured to:
receive a plurality of RF beam selection reports; and
schedule single user or multi user using the plurality of RF beam selection reports.

* * * * *